United States Patent
Manolakos et al.

(10) Patent No.: US 10,938,524 B2
(45) Date of Patent: Mar. 2, 2021

(54) TIMING FOR REFERENCE SIGNALS IN MULTIPLE NUMEROLOGY WIRELESS COMMUNICATIONS

(71) Applicant: QUALCOMM Incorporated, San Diego, CA (US)

(72) Inventors: Alexandros Manolakos, San Diego, CA (US); Alberto Rico Alvarino, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/253,472

(22) Filed: Jan. 22, 2019

(65) Prior Publication Data

US 2019/0229859 A1    Jul. 25, 2019

(30) Foreign Application Priority Data

Jan. 24, 2018  (GR) .............................. 20180100030

(51) Int. Cl.
*H04L 5/00* (2006.01)
*H04W 56/00* (2009.01)

(52) U.S. Cl.
CPC ............ *H04L 5/0005* (2013.01); *H04L 5/001* (2013.01); *H04L 5/0048* (2013.01); *H04W 56/00* (2013.01); *H04L 5/0007* (2013.01); *H04L 5/0053* (2013.01)

(58) Field of Classification Search
CPC ..... H04L 5/0005; H04L 5/001; H04L 5/0048; H04L 5/0053; H04L 5/0007; H04W 56/00
See application file for complete search history.

(56) References Cited

U.S. PATENT DOCUMENTS

2016/0352551 A1* 12/2016 Zhang ................. H04L 27/2602
2017/0366311 A1   12/2017 Iyer et al.
(Continued)

OTHER PUBLICATIONS

CMCC: "Further Considerations on SRS Configuration and Transmission for NR", 3GPP Draft, R1-1703407, 3rd Generation Partnership Project (3GPP), Mobile Competence Centre, 650, Route Des Lucioles, F-06921 Sophia-Antipolis Cedex, France, vol. RAN WG1, No. Athens, Greece, 20170213-20170217, Feb. 12, 2017 (Feb. 12, 2017), XP051210535, 4 pages, Retrieved from the Internet: URL:http://www.3gpp.org/ftp/Meetings_3GPP_SYNC/RAN1/Docs/ [retrieved on Feb. 12, 2017].
(Continued)

*Primary Examiner* — Jeffrey M Rutkowski
*Assistant Examiner* — Chae S Lee
(74) *Attorney, Agent, or Firm* — Qualcomm Incorporated

(57) ABSTRACT

Methods, systems, and devices for wireless communications are described. A user equipment (UE) may receive an indication from a base station to transmit one or more sounding reference signals (SRSs) on respective component carriers (CCs). Each CC may be associated with a different numerology and the UE may determine a transmission timing between reception of the indication and transmission of each of the SRSs based on the numerology for the CC used for transmission. In some cases, the UE may determine the transmission timings based on time durations associated with each numerology, which may be based on a number of symbols for the numerology, a corresponding time between receiving the indication and transmitting uplink data (e.g., SRS), or a combination thereof. The UE may transmit, to the base station, each SRS according to the determined transmission timings.

70 Claims, 16 Drawing Sheets

(56) References Cited

U.S. PATENT DOCUMENTS

| | | | |
|---|---|---|---|
| 2018/0091267 A1* | 3/2018 | Kim | H04L 27/2602 |
| 2018/0262313 A1* | 9/2018 | Nam | H04W 72/0446 |
| 2019/0109688 A1* | 4/2019 | Kim | H04W 74/0891 |
| 2019/0158236 A1* | 5/2019 | Yoo | H04L 5/005 |

OTHER PUBLICATIONS

International Search Report and Written Opinion—PCT/US2019/014713—ISA/EPO—dated Mar. 26, 2019.

\* cited by examiner

TIMING FOR REFERENCE SIGNALS IN MULTIPLE NUMEROLOGY WIRELESS COMMUNICATIONS

CROSS REFERENCES

The present Application for Patent claims the benefit of Greece Provisional Patent Application No. 20180100030 by Manolakos et al., entitled "TIMING FOR REFERENCE SIGNALS IN MULTIPLE NUMEROLOGY WIRELESS COMMUNICATIONS," filed Jan. 24, 2018, assigned to the assignee hereof, and expressly incorporated by reference herein.

INTRODUCTION

The following relates generally to wireless communications, and more specifically to timing for reference signals in multiple numerology wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may support switching between partial bands (e.g., bandwidth parts) for transmitting a reference signal (e.g., sounding reference signal (SRS)) via one or more component carrier (CCs) of a carrier aggregation (CA) scheme. The partial bands may correspond to respective CCs and the base station may determine a partial band for communications with the UE based on reference signals transmitted via the one or more CCs. In some cases, the UE may transmit on different CCs utilizing different numerologies, respective to the other CCs. For example, the UE may transmit a reference signal on a first CC using a first numerology, transmit a reference signal on a second CC using a second numerology, etc. Conventional techniques for scheduling and transmitting reference signals may not properly account for the different numerologies on the different CCs.

SUMMARY

A method of wireless communications is described. The method may include receiving, from a base station, an indication for transmission of a first SRS on a first CC and a second SRS on a second CC, where the first CC is associated with a first numerology and the second CC is associated with a second numerology different from the first numerology, determining a first timing gap between receipt of the indication and transmission of the first SRS on the first CC based on the first numerology, determining a timing for transmission of the second SRS on the second CC after receipt of the indication and after the transmission of the first SRS on the first CC based on the first timing gap and the second numerology, and transmitting the first SRS based on the first timing gap and the second SRS based on the timing for the transmission of the second SRS.

An apparatus for wireless communications is described. The apparatus may include means for receiving, from a base station, an indication for transmission of a first SRS on a first CC and a second SRS on a second CC, where the first CC is associated with a first numerology and the second CC is associated with a second numerology different from the first numerology, means for determining a first timing gap between receipt of the indication and transmission of the first SRS on the first CC based on the first numerology, means for determining a timing for transmission of the second SRS on the second CC after receipt of the indication and after the transmission of the first SRS on the first CC based on the first timing gap and the second numerology, and means for transmitting the first SRS based on the first timing gap and the second SRS based on the timing for the transmission of the second SRS.

Another apparatus for wireless communications is described. The apparatus may include a processor, memory in electronic communication with the processor, and instructions stored in the memory. The instructions may be operable to cause the processor to receive, from a base station, an indication for transmission of a first SRS on a first CC and a second SRS on a second CC, where the first CC is associated with a first numerology and the second CC is associated with a second numerology different from the first numerology, determine a first timing gap between receipt of the indication and transmission of the first SRS on the first CC based on the first numerology, determine a timing for transmission of the second SRS on the second CC after receipt of the indication and after the transmission of the first SRS on the first CC based on the first timing gap and the second numerology, and transmit the first SRS based on the first timing gap and the second SRS based on the timing for the transmission of the second SRS.

A non-transitory computer-readable medium for wireless communications is described. The non-transitory computer-readable medium may include instructions operable to cause a processor to receive, from a base station, an indication for transmission of a first SRS on a first CC and a second SRS on a second CC, where the first CC is associated with a first numerology and the second CC is associated with a second numerology different from the first numerology, determine a first timing gap between receipt of the indication and transmission of the first SRS on the first CC based on the first numerology, determine a timing for transmission of the second SRS on the second CC after receipt of the indication and after the transmission of the first SRS on the first CC based on the first timing gap and the second numerology, and transmit the first SRS based on the first timing gap and the second SRS based on the timing for the transmission of the second SRS.

Some examples of the method, apparatus, and non-transitory computer-readable medium described above may further include processes, features, means, or instructions for determining a first time duration corresponding to a first number of symbols associated with the first numerology, where the first timing gap may be determined based on the first time duration.

In some examples of the method, apparatus, and non-transitory computer-readable medium described above, the first number of symbols corresponds to a time between receipt of an uplink grant and transmission of uplink data for the first numerology, a time between receipt of a channel state information reference signal (CSIRS) and transmission of a channel state feedback (CSF) message for the first numerology, a time between receipt of a physical downlink control channel (PDCCH) message and transmission of the first SRS for the first numerology, or any combination thereof.

Some examples of the method, apparatus, and non-transitory computer-readable medium described above may further include processes, features, means, or instructions for determining a second time duration corresponding to a second number of symbols associated with the second numerology, where the timing for the transmission of the second SRS on the second CC may be determined based on the first time duration and the second time duration.

Some examples of the method, apparatus, and non-transitory computer-readable medium described above may further include processes, features, means, or instructions for determining the second time duration based on a retune time associated with retuning from the first CC to the second CC and a transmission time associated with transmission of the first SRS on the first CC.

In some examples of the method, apparatus, and non-transitory computer-readable medium described above, the second number of symbols corresponds to a time between receipt of an uplink grant and transmission of uplink data for the second numerology, a time between receipt of a C SIRS and transmission of a CSF message for the second numerology, or a time between receipt of a PDCCH message and transmission of the second SRS for the second numerology.

In some examples of the method, apparatus, and non-transitory computer-readable medium described above, receiving the indication includes receiving an indication for transmission of a third SRS on a third CC associated with a third numerology different from the first and second numerologies.

Some examples of the method, apparatus, and non-transitory computer-readable medium described above may further include processes, features, means, or instructions for determining a timing for transmission of the third SRS on the third CC after receipt of the indication for transmission of the third SRS on the third CC and after the transmission of the second SRS based on the timing for the transmission of the second SRS and the third numerology. Some examples of the method, apparatus, and non-transitory computer-readable medium described above may further include processes, features, means, or instructions for transmitting the third SRS based on the timing for the transmission of the third SRS.

In some examples of the method, apparatus, and non-transitory computer-readable medium described above, receiving the indication includes receiving an indication for transmission of additional SRSs on respective CCs.

Some examples of the method, apparatus, and non-transitory computer-readable medium described above may further include processes, features, means, or instructions for determining respective transmission timings for the additional SRSs based on numerologies associated with the respective CCs.

Some examples of the method, apparatus, and non-transitory computer-readable medium described above may further include processes, features, means, or instructions for transmitting the additional SRSs on respective CCs based on the respective transmission timings.

In some examples of the method, apparatus, and non-transitory computer-readable medium described above, the indication includes a grant scheduling the first and second SRS transmissions and may be received via a PDCCH.

In some examples of the method, apparatus, and non-transitory computer-readable medium described above, the indication includes a CSIRS.

A method of wireless communications is described. The method may include receiving, from a base station, an indication for transmission of a first SRS on a first CC and a second SRS on a second CC, where the first CC is associated with a first numerology and the second CC is associated with a second numerology different from the first numerology, determining a first timing gap between receipt of the indication and transmission of the first SRS on the first CC based on the first numerology and the second numerology, determining a timing for transmission of the second SRS on the second CC after receipt of the indication and after the transmission of the first SRS on the first CC and the second SRS on the second CC based on the first timing gap, and transmitting the first SRS based on the first timing gap and the second SRS based on the timing for the transmission of the second SRS.

An apparatus for wireless communications is described. The apparatus may include means for receiving, from a base station, an indication for transmission of a first SRS on a first CC and a second SRS on a second CC, where the first CC is associated with a first numerology and the second CC is associated with a second numerology different from the first numerology, means for determining a first timing gap between receipt of the indication and transmission of the first SRS on the first CC based on the first numerology and the second numerology, means for determining a timing for transmission of the second SRS on the second CC after receipt of the indication and after the transmission of the first SRS on the first CC based on the first timing gap, and means for transmitting the first SRS based on the first timing gap and the second SRS based on the timing for the transmission of the second SRS.

Another apparatus for wireless communications is described. The apparatus may include a processor, memory in electronic communication with the processor, and instructions stored in the memory. The instructions may be operable to cause the processor to receive, from a base station, an indication for transmission of a first SRS on a first CC and a second SRS on a second CC, where the first CC is associated with a first numerology and the second CC is associated with a second numerology different from the first numerology, determine a first timing gap between receipt of the indication and transmission of the first SRS on the first CC based on the first numerology and the second numerology, determine a timing for transmission of the second SRS on the second CC after receipt of the indication and after the transmission of the first SRS on the first CC based on the first timing gap, and transmit the first SRS based on the first timing gap and the second SRS based on the timing for the transmission of the second SRS.

A non-transitory computer-readable medium for wireless communications is described. The non-transitory computer-readable medium may include instructions operable to cause a processor to receive, from a base station, an indication for transmission of a first SRS on a first CC and a second SRS on a second CC, where the first CC is associated with a first numerology and the second CC is associated with a second numerology different from the first numerology, determine a first timing gap between receipt of the indication and transmission of the first SRS on the first CC based on the first numerology and the second numerology, determine a timing for transmission of the second SRS on the second CC after receipt of the indication and after the transmission of the first SRS on the first CC based on the first timing gap, and transmit the first SRS based on the first timing gap and the second SRS based on the timing for the transmission of the second SRS.

In some examples of the method, apparatus, and non-transitory computer-readable medium described above, determining the first timing gap includes determining a first time duration associated with the first numerology, determining a second time duration associated with the second numerology, and determining a maximum of the first time duration and the second time duration.

Some examples of the method, apparatus, and non-transitory computer-readable medium described above may further include processes, features, means, or instructions for determining a first time duration corresponding to a first number of symbols associated with the first numerology. Some examples of the method, apparatus, and non-transitory computer-readable medium described above may further include processes, features, means, or instructions for determining a second time duration corresponding to a second number of symbols associated with the second numerology, where the first timing gap may be determined based on the first and second time durations.

In some examples of the method, apparatus, and non-transitory computer-readable medium described above, the first number of symbols corresponds to a time between receipt of an uplink grant and transmission of uplink data for the first numerology, a time between receipt of a C SIRS and transmission of a CSF message for the first numerology, a time between receipt of a PDCCH message and transmission of the first SRS for the first numerology, or any combination thereof.

In some examples of the method, apparatus, and non-transitory computer-readable medium described above, the second number of symbols corresponds to a time between receipt of an uplink grant and transmission of uplink data for the second numerology, a time between receipt of a C SIRS and transmission of a CSF message for the second numerology, or a time between receipt of a PDCCH message and transmission of the second SRS for the second numerology.

Some examples of the method, apparatus, and non-transitory computer-readable medium described above may further include processes, features, means, or instructions for determining the timing for the transmission of the second SRS on the second CC based on a retune time associated with retuning from the first CC to the second CC and a transmission time associated with transmission of the first SRS on the first CC.

In some examples of the method, apparatus, and non-transitory computer-readable medium described above, receiving the indication includes receiving an indication for transmission of a third SRS on a third CC associated with a third numerology different from the first and second numerologies.

Some examples of the method, apparatus, and non-transitory computer-readable medium described above may further include processes, features, means, or instructions for determining a first time duration corresponding to a first number of symbols associated with the first numerology. Some examples of the method, apparatus, and non-transitory computer-readable medium described above may further include processes, features, means, or instructions for determining a second time duration corresponding to a second number of symbols associated with the second numerology.

Some examples of the method, apparatus, and non-transitory computer-readable medium described above may further include processes, features, means, or instructions for determining a third time duration corresponding to a third number of symbols associated with the third numerology, where the first timing gap may be determined based on the first, second, and third time durations.

Some examples of the method, apparatus, and non-transitory computer-readable medium described above may further include processes, features, means, or instructions for determining a timing for transmission of the third SRS on the third CC after receipt of the indication for transmission of the third SRS on the third CC and after the transmission of the second SRS on the second CC based on the timing for the transmission of the second SRS. Some examples of the method, apparatus, and non-transitory computer-readable medium described above may further include processes, features, means, or instructions for transmitting the third SRS based on the timing for the transmission of the third SRS.

In some examples of the method, apparatus, and non-transitory computer-readable medium described above, receiving the indication includes receiving an indication for transmission of additional SRSs on respective CCs associated with respective numerologies.

Some examples of the method, apparatus, and non-transitory computer-readable medium described above may further include processes, features, means, or instructions for determining additional time durations corresponding to respective numbers of symbols associated with the respective numerologies, where the first timing gap may be determined based on the additional time durations.

In some examples of the method, apparatus, and non-transitory computer-readable medium described above, the indication includes a grant scheduling the first and second SRS transmissions and may be received via a PDCCH.

In some examples of the method, apparatus, and non-transitory computer-readable medium described above, the indication includes a CSIRS.

A method of wireless communications is described. The method may include transmitting, to a UE, an indication for transmission of a first SRS on a first CC and a second SRS on a second CC, where the first CC is associated with a first numerology and the second CC is associated with a second numerology different from the first numerology, receiving, after a first timing gap based on the first numerology, the first SRS on the first CC, and receiving, after a transmission timing for the second SRS based on the first timing gap, the second SRS on the second CC.

An apparatus for wireless communications is described. The apparatus may include means for transmitting, to a UE, an indication for transmission of a first SRS on a first CC and a second SRS on a second CC, where the first CC is associated with a first numerology and the second CC is associated with a second numerology different from the first numerology, means for receiving, after a first timing gap based on the first numerology, the first SRS on the first CC, and means for receiving, after a transmission timing for the second SRS based on the first timing gap, the second SRS on the second CC.

Another apparatus for wireless communications is described. The apparatus may include a processor, memory in electronic communication with the processor, and instructions stored in the memory. The instructions may be operable to cause the processor to transmit, to a UE, an indication for transmission of a first SRS on a first CC and a second SRS on a second CC, where the first CC is associated with a first numerology and the second CC is associated with a second numerology different from the first numerology, receive, after a first timing gap based on the first numerology, the first SRS on the first CC, and receive, after a transmission timing for the second SRS based on the first timing gap, the second SRS on the second CC.

A non-transitory computer-readable medium for wireless communications is described. The non-transitory computer-readable medium may include instructions operable to cause a processor to transmit, to a UE, an indication for transmission of a first SRS on a first CC and a second SRS on a second CC, where the first CC is associated with a first numerology and the second CC is associated with a second numerology different from the first numerology, receive, after a first timing gap based on the first numerology, the first SRS on the first CC, and receive, after a transmission timing for the second SRS based on the first timing gap, the second SRS on the second CC.

In some examples of the method, apparatus, and non-transitory computer-readable medium described above, the first timing gap may be based on a first number of symbols associated with the first numerology. In some examples of the method, apparatus, and non-transitory computer-readable medium described above, the transmission timing for the second SRS may be based on a second number of symbols associated with the second numerology.

In some examples of the method, apparatus, and non-transitory computer-readable medium described above, the first timing gap may be based on the second numerology.

In some examples of the method, apparatus, and non-transitory computer-readable medium described above, the transmission timing for the second SRS may be based on a retune time associated with retuning from the first CC to the second CC and a transmission time associated with transmission of the first SRS on the first CC.

In some examples of the method, apparatus, and non-transitory computer-readable medium described above, transmitting the indication includes transmitting an indication for transmission of a third SRS on a third CC associated with a third numerology different from the first and second numerologies.

Some examples of the method, apparatus, and non-transitory computer-readable medium described above may further include processes, features, means, or instructions for receiving, after a transmission timing for the third SRS based on the transmission timing for the second SRS, the third SRS on the third CC.

In some examples of the method, apparatus, and non-transitory computer-readable medium described above, the indication includes a grant scheduling the first and second SRS transmissions and may be transmitted via a PDCCH.

In some examples of the method, apparatus, and non-transitory computer-readable medium described above, the indication includes a CSIRS.

DETAILED DESCRIPTION

Figure 1:
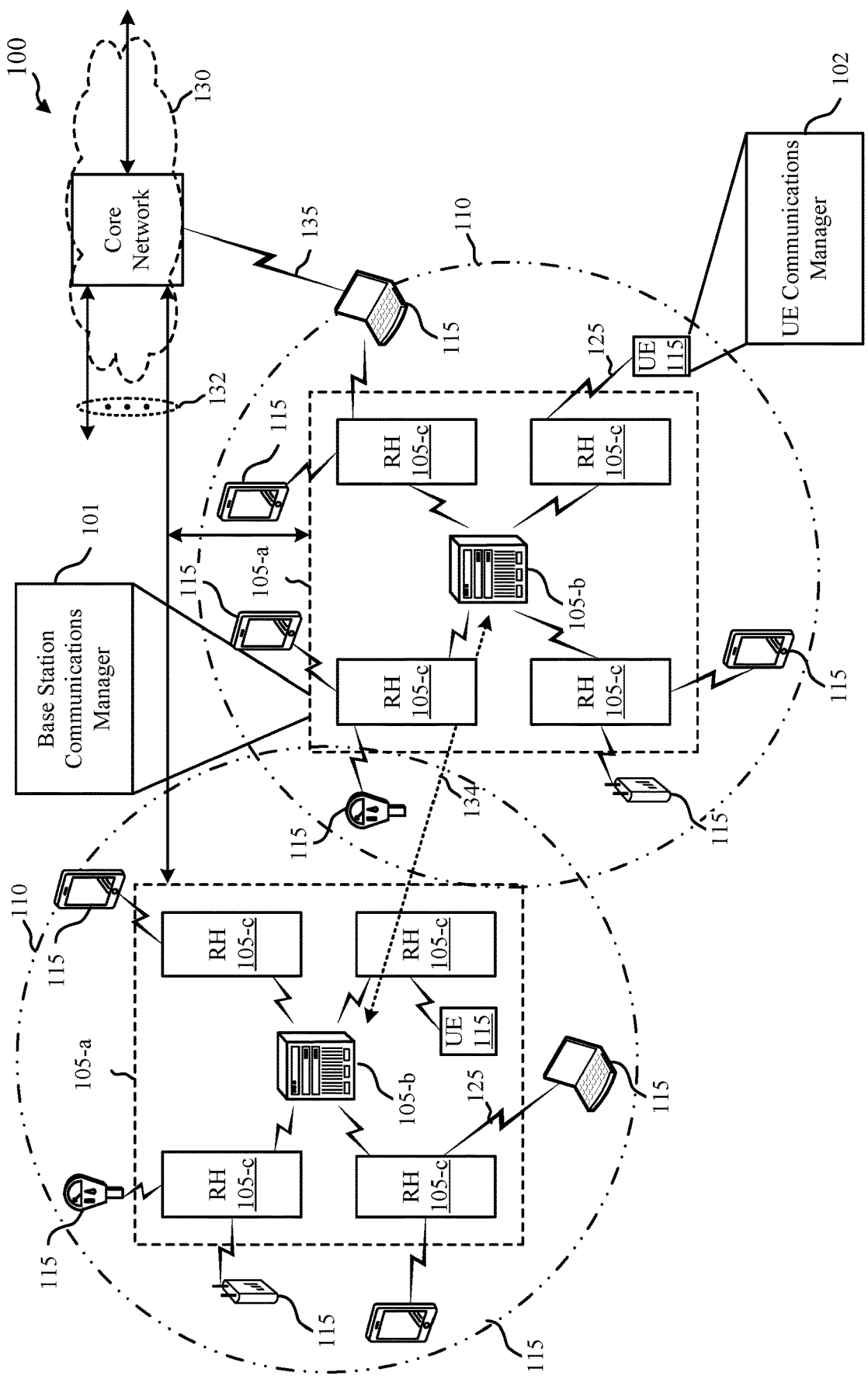
FIG. 1 illustrates an example of a wireless communications system that supports timing for reference signals in multiple numerology wireless communications in accordance with one or more aspects of the present disclosure.

A wireless communications system (e.g., an LTE network, an LTE-A network, an LTE-A Pro network, or an NR network) may support switching between partial bands (e.g., bandwidth parts) for SRS transmissions. For example, a UE may aperiodically transmit an SRS on a first CC, and transmit an SRS on a second CC, etc., for a set of CCs indicated by a base station. In some cases, the base station may determine a partial band for communications with the UE based on the SRSs transmitted by the UE. The base station may transmit an indication of which CCs are to be used for SRS transmission and in which order the UE may transmit the SRSs (on the different CCs). However, the UE may transmit the SRSs utilizing a different numerology per CC, which may cause interference, collisions, or interruptions between one or more of the SRSs. Accordingly, the UE may determine a schedule for transmitting the SRSs based on timing gaps determined for each SRS and corresponding numerologies associated with the different CCs for SRS transmissions.

In some cases, the UE may transmit a first SRS on a first CC according to a sequence indicated in a downlink transmission (e.g., a PDCCH carrying a grant scheduling the SRSs). The UE may transmit the first SRS according to a determined first time gap (e.g., $T_1$) after receiving the downlink transmission, where the first time gap is based on a numerology of the first CC (e.g., $N2_{CC1}$). The UE may transmit subsequent SRSs on their respective CCs after respective time gaps determined for each SRS. For example, the UE may determine a second time gap for transmitting a second SRS based on the first time gap, the duration of the first SRS transmission, and an uplink or downlink retune time (e.g., $T_1 + T_{SRS} + T_{Retune-time}$). Alternatively, the UE may determine the second time gap for transmitting the second SRS based on a numerology of the second CC (e.g., $N2_{CC2}$). Accordingly, the UE may determine the second time gap for the second SRS based on which value is greater (e.g., between $T_1+T_{SRS}+T_{Retune-time}$ and $N2_{CC2}$). Subsequent SRSs may be transmitted based on time gaps determined in a similar manner, where the i-th SRS on the i-th CC may be transmitted according to $\max(T_{i-1}+T_{SRS}+T_{Retune-time}, N2_{CCi})$. The time gaps based on the numerologies of the CCs (e.g., $N2_{CC1}, N2_{CC2}, \ldots N2_{CCn}$) may indicate a time for the UE to receive and decode the downlink transmission (e.g., uplink grant) before starting transmissions of the SRSs (e.g., uplink data).

Alternatively, the UE may transmit a first SRS according to a first time gap based on a maximum time gap determined for n CCs based on their respective numerologies (e.g., $\max(N2_{CC1}, N2_{CC2}, \ldots N2_{CCn})$). The UE may then transmit subsequent SRSs based on the preceding time gap, duration of the preceding SRS transmission, and a retune time as discussed above. For example, the UE may transmit the first SRS on the first CC according to a first time gap (e.g., $T_1$) after a downlink transmission based on the maximum time gap for a set of CCs indicated by the downlink transmission, and then transmit the second SRS according to the first time gap, the duration of the first SRS, and a retune time (e.g., $T_1+T_{SRS}+T_{Retune-time}$). That is, the UE may wait a certain number symbols such that any SRS transmission of any of the CCs may be possible, and thereafter, the UE may begin transmission of the SRSs in each CC based on the sequence indicated in the downlink transmission.

In some cases, the downlink transmission may be associated with a CSIRS, and the SRS may be associated with a CSF message. Accordingly, the time gaps based on the numerologies of the CCs may correspond to the CSIRS (e.g., $N3_{CC1}, N3_{CC2}, \ldots N3_{CCn}$). Additionally or alternatively, the UE may determine the time gaps based on the numerologies of the CCs in order to indicate a time between reception of a downlink transmission (e.g., PDCCH) and a specific SRS transmission (e.g., $N4_{CC1}, N4_{CC2}, \ldots N4_{CCn}$).

Aspects of the disclosure are initially described in the context of wireless communications systems. Further aspects of the disclosure are described with reference to reference signal timing gap configurations, a reference signal transmission scheme, and a process flow. Aspects of the disclosure are further illustrated by and described with reference to apparatus diagrams, system diagrams, and flowcharts that relate to timing for reference signals in multiple numerology wireless communications.

FIG. 1 illustrates an example of a wireless communications system 100 in accordance with various aspects of the present disclosure. The wireless communications system 100 includes network devices 105 (e.g., next generation NodeBs (gNodeBs or gNBs), evolved nodeBs (eNBs), radio heads (RHs)), UEs 115, and a core network 130. In some examples, the wireless communications system 100 may be an LTE network, an LTE-A network, an LTE-A Pro network, or an NR network. Wireless communications system 100 may support enhanced broadband communications, ultra-reliable (e.g., mission critical) communications, low latency communications, or communications with low-cost and low-complexity devices.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (S1, S2, etc.) and may perform radio configuration and scheduling for communication with the UEs 115. In various examples, the network devices 105-b may communicate, either directly or indirectly (e.g., through core network 130), with each other over backhaul links 134 (X1, X2, etc.), which may be wired or wireless communication links.

Each network device 105-b may also additionally or alternatively communicate with a number of UEs 115 through a number of other network devices 105-c, where network device 105-c may be an example of a smart RH (or through a number of smart RHs). At least some of the network devices 105 may include subcomponents such as an access network entity, which may be an example of an ANC. Each access network entity may communicate with UEs 115 through a number of other access network transmission entities, which may be referred to as a RH, a smart RH, or a transmission/reception point (TRP). In some configurations, various functions of each access network entity or network device 105 may be distributed across various network devices 105 (e.g., RHs and access network controllers) or consolidated into a single network device 105 (e.g., a base station).

The communication networks that may accommodate some of the various disclosed examples may be packet-based networks that operate according to a layered protocol stack. In the user plane, communications at the bearer over packet data convergence protocol (PDCP) layer may be Internet Protocol (IP)-based or non-IP based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the radio resource control (RRC) protocol layer may provide establishment, configuration, and maintenance of an RRC connection between a UE 115 and a network device 105-c, network device 105-b, or core network 130 supporting radio bearers for user plane data. At the Physical layer, transport channels may be mapped to physical channels.

The geographic coverage area 110 for a network device 105 (e.g., a base station) may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 (e.g., a base station) may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 (e.g., the same base station) or by different network devices 105 (e.g., different base stations). The wireless communications system 100 may include, for example, a heterogeneous LTE/LTE-A/LTE-A Pro or NR network in which different types of network devices 105 (e.g., different types of base stations) provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 (e.g., base stations) may communicate with the core network 130 and with one another. For example, network devices 105 may interface with the core network 130 through backhaul links 132 (e.g., via an S1 or other interface). Network devices 105 may communicate with one another over backhaul links 134 (e.g., via an X2 or other interface) either directly (e.g., directly between network devices 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 (e.g., base stations) associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105, such as a network device 105, may include subcomponents such as an access network entity, which may be an example of an ANC. Each access network entity may communicate with UEs 115 through a number of other access network transmission entities, which may be referred to as a RH, a smart RH, or a TRP. In some configurations, various functions of each access network entity or network device 105 may be distributed across various network devices 105 (e.g., RHs and access network controllers) or consolidated into a single network device 105 (e.g., a base station).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105 (e.g., base stations), and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 (e.g., base stations) and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 (e.g., a base station) may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 (e.g., a base station) or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, UEs 115 and network devices 105 (e.g., base stations) may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105 (e.g., a base station).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of defined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 (e.g., base stations) and/or UEs that can support simultaneous communications via carriers associated with more than one different carrier bandwidth.

Wireless communications system 100 may support communication with a UE 115 on multiple cells or carriers, a feature which may be referred to as CA (CA) or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105 (e.g., a base station), utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A reference signal may be a signal known to the receiver, that is inserted into a transmitted signal in order to facilitate channel estimation for coherent de-modulation and measurements. In some downlink transmissions, cell-specific reference signals are provided which are available to all UEs in a cell. UE-specific RSs may be embedded in the data for specific UEs, and Multimedia Broadcast Single Frequency Network (MBSFN)-specific RSs are provided in case of MBSFN operation. These RSs occupy specified Resource Elements (REs) within a symbol of the subframe. In some uplink transmissions, demodulation RSs (DM-RS) and SRSs are provided for channel estimation for demodulation and channel sounding respectively. Additionally, the UE 115 may be configured with multiple resources, where the resources are grouped according to a use case (e.g., uplink channel state information (CSI) acquisition, uplink non-codebook precoding, uplink analog beamforming).

An SRS may be transmitted by UE 115 using a defined sequence (e.g., a Zadoff-Chu sequence) so that a network device 105 (e.g., a base station) may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, multiple SRSs from the same or different UEs may span varying bandwidths and number of symbols in an uplink subframe. In some examples, to ensure phase continuity between one or more SRSs, the SRSs from the same UE, are either transmitted within one subframe, or the network device 105 and the UE 115 may maintain one or more continuing phases when switching from uplink transmission to downlink transmission. In some examples, multiple SRSs from the same UEs may be concatenated together to get a wideband SRS at a receiver.

An SRS may additionally or alternatively be scheduled on multiple antenna ports and may still be considered a single SRS transmission. In some cases, SRS resources may span a set of adjacent symbols (e.g., 1, 2, or 4 symbols) with up to 4 ports per SRS resource, where all ports of an SRS resource are sounded in each symbol. Additionally, an SRS may be transmitted across a wideband or subband, where an SRS bandwidth may include multiples of 4 RBs. An SRS transmission may be categorized as a Type 0 (periodically transmitted at equally spaced intervals) SRS or as a Type 1 (aperiodic) SRS (e.g., downlink control information (DCI)-signaled) or as semi-persistently. Thus, data gathered by a network device 105 (e.g., a base station) from an SRS may be used to inform an uplink scheduler. A network device 105 (e.g., a base station) may additionally or alternatively utilize an SRS to check timing alignment status and send time alignment commands to the UE 115. Additionally, SRS antenna switching inside a carrier may be supported based on the SRS transmissions.

In some cases, wireless communications system 100 (e.g., an NR system) may support a UE 115 switching between partial bands (e.g., bandwidth part) for SRS transmissions in a CC (e.g., when the UE 115 is capable of transmitting in one partial band in a CC at a time). Accordingly, an SRS carrier-based switching design may be specified in order to indicate a sequence for switching between CCs for SRS transmissions. The SRS carrier-based switching design may include an indication for periodic/aperiodic/semi-persistent SRS transmissions on a CC without physical uplink control channel (PUCCH)/physical uplink shared channel (PUSCH) configured, a timing advance (through physical random access channel (PRACH)) on a timing advance group (TAG), without PUCCH/PUSCH configured, power control separated from that of PUSCH, a group common DCI for aperiodic SRS triggering and transmit power control (TPC), and downlink/uplink interruptions and collision handling due to SRS switching.

In some examples, a Type 1 SRS (e.g., aperiodic) may be triggered for more than one TDD serving cell (e.g., CC) in a DCI format (e.g., format 3B), and a UE 115 may be configured with more than a set of TDD serving cells (e.g., greater than 5) without PUCCH/PUSCH transmissions configured. Accordingly, an order of triggered SRS transmissions on the serving cells may follow an order of the serving cells in an indicated set of serving cells configured by higher layers (e.g., RRC). Alternatively, a Type 1 SRS (e.g., aperiodic) may be triggered for more than one TDD serving cell in a DCI format (e.g., format 3B), and a UE 115 may be configured with no more than a set of TDD serving cells (e.g., less than or equal to 5) without PUCCH/PUSCH transmissions configured. Accordingly, an order of triggered SRS transmissions on the serving cells may follow an order of the serving cells with Type 1 SRS triggered in the DCI (e.g., a network device 105 (e.g., a base station) may determine the order and transmit it to the UE 115 in PDCCH). The SRS resource for the n-th SRS transmission, where n≥2, may be determined such that it is the first SRS resource on or after the SRS resource for the (n−1)-th SRS transmission provided it does not collide with any previous SRS transmission triggered in the DCI format (e.g., 3B) or interruption due to uplink or downlink radio frequency retuning time.

As the UE 115 may transmit an SRS on multiple CCs (e.g., serving cells) according to an identified order as described above, each CC may include a different numerology configurable specific to the UE 115 (e.g., each CC has a specific subcarrier spacing and/or symbol length for uplink transmissions). Since each CC may include a different numerology, the UE 115 may configure a timing for each aperiodic SRS transmission based on when an uplink grant is received triggering the SRSs (e.g., on a PDCCH from a network device 105 (e.g., a base station)). For example, the UE 115 may determine the timings (e.g., N2) based on a time needed between receiving and decoding the grant and starting transmission of uplink data (e.g., SRSs) if the SRS is not associated with CSIRS. The timings may depend on the numerology of the CC and be measured in slots. Alternatively, the UE 115 may determine the timings (e.g., N3) based on a time needed between a CSIRS and transmitting a CSF message if the SRS is associated with CSIRS. Similarly, these timings may depend on the numerology of the CC and be measured in slots.

Wireless communications system 100 may support efficient techniques for determining timings and a schedule for transmitting the SRSs on each of the CCs in accordance with the identified order for SRS transmissions. For example, a UE 115 may transmit a first SRS on a first CC according to a determined first time gap (e.g., $T_1$) after receiving a grant triggering the SRS transmissions, where the first time gap is based on a numerology of the first CC (e.g., $N2_{CC1}$). The UE 115 may then transmit subsequent SRSs on their respective CCs after respective time gaps determined for each SRS. For example, the UE may determine a second time gap for transmitting a second SRS based on the first time gap, the duration of the first SRS transmission, and an uplink or downlink retune time (e.g., $T_1+T_{SRS}T_{Retune-time}$). Alternatively, the UE 115 may determine the second time gap for transmitting the second SRS based on a numerology of the second CC (e.g., $N2_{CC2}$). Accordingly, the UE 115 may determine the second time gap for the second SRS based on which value is greater (e.g., between $T_1+T_{SRS}+T_{Retune-time}$ and $N2_{CC2}$). Subsequent SRSs may be transmitted based on time gaps determined in a similar manner, where the i-th SRS on the i-th CC may be transmitted according to max $(T_{i-1}+T_{SRS}+T_{Retune-time}, N2_{CCi})$.

Alternatively, the UE 115 may transmit a first SRS according to a first time gap based on a maximum time gap determined for n CCs based on their respective numerologies (e.g., $\max(N2_{CC1}, N2_{CC2}, \ldots N2_{CCn})$). For example, if there are two CCs with $N2_{CC1}$ and $N2_{CC2}$, respectively, the higher valued $N2_{CC}$ may be chosen. At least one of these numerologies may or may not be the same as that indicated by the downlink grant. The UE 115 may then transmit subsequent SRSs based on the preceding time gap, duration of the preceding SRS transmission, and a retune time as discussed above. For example, the UE 115 may transmit the first SRS on the first CC according to a first time gap (e.g., $T_1$) after receiving the grant based on the maximum time gap for a set of CCs, and then transmit the second SRS according to the first time gap, the duration of the first SRS, and the retune time (e.g., $T_1+T_{SRS}T_{Retune-time}$). That is, the UE 115 may wait enough symbols such that any SRS transmission of any of the CCs could happen, and then the UE 115 may start transmitting the SRSs in each CC based on the order indicated in the grant.

In some cases, the grant may be associated with a CSIRS, and the SRS may be associated with a CSF message. Accordingly, the time gaps based on the numerologies of the CCs may correspond to the CSIRS (e.g., $N3_{CC1}$, $N3_{CC2}, \ldots N3_{CCn}$). Additionally or alternatively, the UE 115 may determine the time gaps based on the numerologies of the CCs in order to indicate a time between reception of a downlink transmission (e.g., PDCCH uplink grant) and a specific SRS transmission (e.g., $N4_{CC1}, N4_{CC2}, \ldots N4_{CCn}$).

One or more of the network devices 105 (e.g., base stations) may include a base station communications manager 101, which may transmit, to a UE 115, an indication for transmission of a first SRS on a first CC, a second SRS on a second CC, a third SRS on a third CC, etc. for a set of CCs. Additionally, each CC may be associated with a different numerology. The base station communications manager 101 may then receive each of the SRSs after a corresponding time gap, where the time gaps may be based on numerologies of the respective CCs or preceding time gaps.

Additionally, UEs 115 may include a UE communications manager 102, which may receive, from a network device 105 (e.g., a base station), an indication for transmission of a first SRS on a first CC, a second SRS on a second CC, a third SRS on a third CC, etc., where each CC is associated with a different numerology. The UE communications manager 102 may then determine a timing gap for each SRS transmission and transmit the SRSs according to the determined timing gaps. In some cases, the timing gaps may be determined based on the numerology for the respective CC and/or a preceding timing gap, where each timing gap may further be determined based on a corresponding determined time duration.

Figure 2:
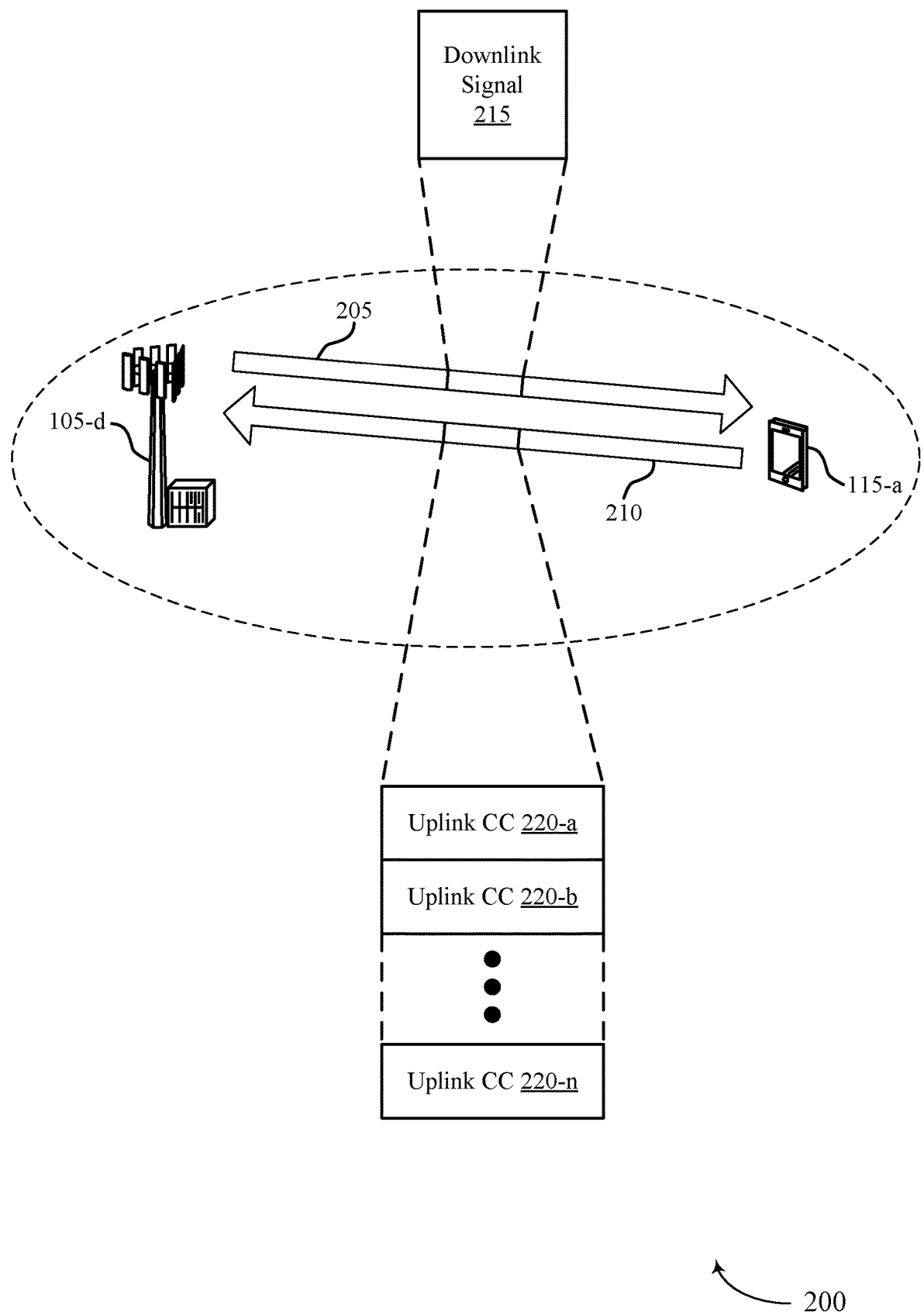
FIG. 2 illustrates an example of a wireless communications system that supports timing for reference signals in multiple numerology wireless communications in accordance with one or more aspects of the present disclosure.

FIG. 2 illustrates an example of a wireless communications system 200 that supports timing for reference signals in multiple numerology wireless communications in accordance with various aspects of the present disclosure. In some examples, wireless communications system 200 may implement aspects of wireless communications system 100. Wireless communications system 200 may include a network device 105-*d* (e.g., a base station) and a UE 115-*a*, which may be examples of corresponding network devices 105 (e.g., base stations) and UEs 115 as described with reference to FIG. 1. As described herein, network device 105-*d* may transmit a grant on resources of a carrier 205 to UE 115-a, which may in turn cause UE 115-a to transmit a response on one or more CCs of a carrier 210. For example, network device 105-d may transmit a downlink signal 215 on a serving cell for UE 115-a on carrier 205. Downlink signal 215 may include a grant that triggers UE 115-a to transmit reference signals on uplink CCs 220 of carrier 210. UE 115-a may transmit the reference signals according to determined time gaps in order to mitigate collisions of reference signals between CCs and interruptions due to retuning times of preceding reference signals.

Network device 105-d may transmit downlink signal 215 to UE 115-a in order to support UE 115-a switching between partial bands for SRS transmissions in a CC. For example, downlink signal 215 may include a PDCCH grant for triggering UE 115-a to transmit an SRS on each uplink CC 220. Additionally or alternatively, downlink signal 215 may include a CSIRS, which may trigger UE 115-a to transmit an SRS in the form of a CSF message on each uplink CC 220. The downlink signal 215 may further include an order to indicate a sequence for transmitting an SRS on respective uplink CCs 220. For example, UE 115-a may transmit a first SRS on uplink CC 220-a, a second SRS on uplink CC 220-b, up to an n-th SRS on uplink CC 220-n. The numerology of downlink signal 215 may be the same as that of at least one of the uplink CCs 220.

As described above, each uplink CC 220 may have a different numerology. For example, uplink CC 220-a may have a first numerology, uplink CC 220-b may have a second numerology different from the first numerology, and uplink CC 220-n may have an n-th numerology different from the previous numerologies. Accordingly, UE 115-a may determine different timing gaps (e.g., N2) for each SRS transmitted on each uplink CC 220 based in part on the respective uplink CC 220 numerology.

In some cases, UE 115-a may determine a first timing gap for the first SRS transmitted in uplink CC 220-a based on the numerology of uplink CC 220-a. UE 115-a may then determine timing gaps for subsequent timing gaps based on a numerology for the respective uplink CC 220 or based in part on the previous timing gap. For example, UE 115-a may determine a second timing gap for the second SRS transmitted in uplink CC 220-b based on the numerology of uplink CC 220-b. Alternatively, UE 115-a may determine the second timing gap for the second SRS transmissions in uplink CC 220-b based on the first timing gap, duration of the first SRS transmitted, and a retune time. UE 115-a may choose the second timing gap based on which determined value is greater. UE 115-a may determine subsequent timing gaps in a similar manner, where the i-th SRS on the i-th CC may be transmitted according to the maximum value between the timing gap determined based on the i-th numerology and the timing gap determined based on the (i−1)-th timing gap, duration of the (i−1)-th SRS transmitted, and a retune time. Accordingly, after each timing gap ends, UE 115-a may transmit the respective SRS at a next available opportunity.

Alternatively, UE 115-a may determine the first timing gap for the SRS transmitted in uplink CC 220-a based on a maximum value of timing gaps determined by numerologies for respective uplink CCs 220. For example, uplink CC 220-a may correspond to a first timing gap based on the numerology of uplink CC 220-a, uplink CC 220-b may correspond to a second timing gap based on the numerology of uplink CC 220-b, and uplink CC 220-n may correspond to an n-th timing gap based on the numerology of uplink CC 220-n. Whichever timing gap is the largest may then become the first timing gap for transmitting the first SRS in uplink CC 220-a. UE 115-a may then determine subsequent SRS transmissions in subsequent uplink CCs 220 based off the previous timing gap, a duration of the previously transmitted SRS, and a retune time.

If downlink signal 215 includes a CSIRS and the transmitted SRSs are associated with the CSIRS, the determined timing gaps may further be based on this distinction in addition to the numerology of the uplink CC 220 (e.g., N3). Additionally or alternatively, UE 115-a may determine the timing gaps based on a time between receiving a PDCCH (e.g., downlink signal 215) to a respective SRS transmission (e.g., N4).

Figure 3A:
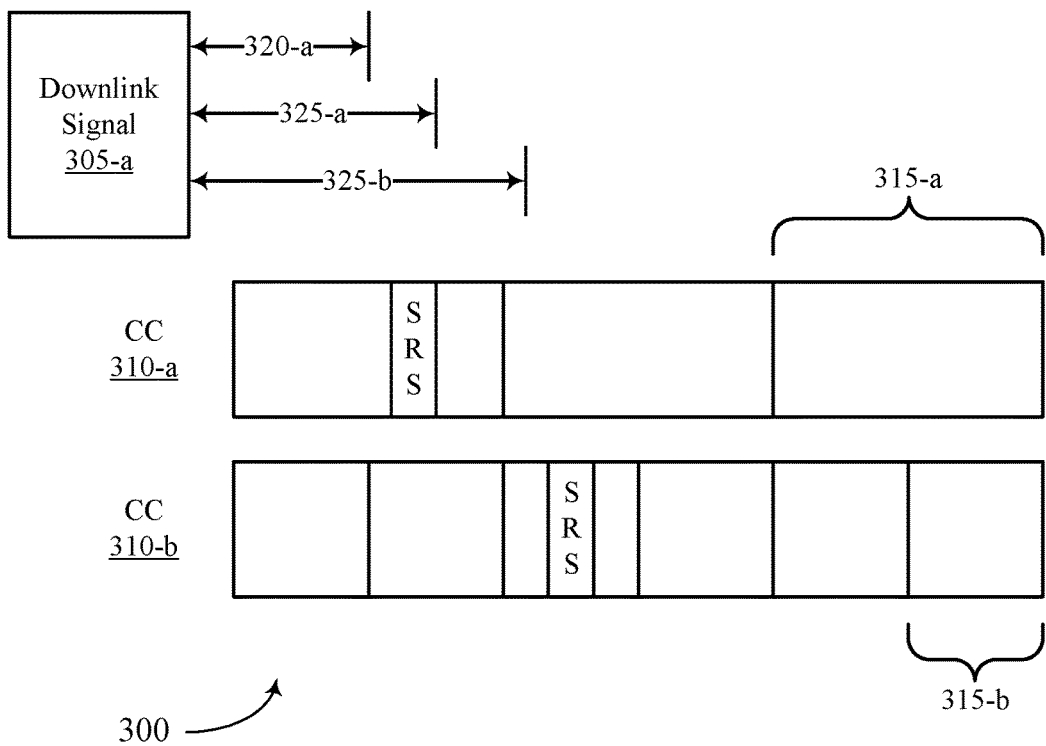
FIGS. 3A and 3B illustrate examples of reference signal timing gap configurations that support timing for reference signals in multiple numerology wireless communications in accordance with one or more aspects of the present disclosure.

FIG. 3A illustrates an example of reference signal timing gap configuration 300 that supports timing for reference signals in multiple numerology wireless communications in accordance with various aspects of the present disclosure. In some examples, reference signal timing gap configuration 300 may implement aspects of wireless communications systems 100 and 200. Reference signal timing gap configuration 300 may include a configuration for transmitting one or more SRSs on respective CCs with different determined timing gaps as described above with reference to FIGS. 1 and 2.

For an n-th aperiodic SRS transmission, where n≥1, on a cell c, upon detection of a positive SRS request on a grant (e.g., downlink signal 305-a), a UE 115 may start (i.e., commence) the corresponding SRS transmission provided it does not collide with any previous SRS transmissions triggered by the grant, or interruption due to uplink or downlink radio frequency retuning time ($T_{Retune-time}$), on the configured symbol of the first slot which is no earlier than any $N_2^{\mu_c}$ OFDM symbols after the last symbol of a PDCCH carrying the grant scheduling the SRS transmission, with $N_2^{\mu_c}$ based on the numerology $\mu_c$ used in cell c; and $T_{Retune-time}$ seconds after the previous SRS transmissions (if any) triggered by the grant. Otherwise, the n-th SRS transmission may be dropped.

For a case of transmitting three SRSs on three respective CCs, a UE 115 may determine respective time gaps before transmitting each SRS based on the following equations:

$$T_1 = N_2^{\mu_1} \quad (1)$$

$$T_2 = \max(T_1 + T_{Retune-time}, N_2^{\mu_2}) \quad (2)$$

$$T_3 = \max(T_2 + T_{Retune-time}, N_2^{\mu_3}) \quad (3)$$

where $T_1$ indicates a first time gap before transmitting a first SRS on a first CC, $T_2$ indicates a second time gap before transmitting a second SRS on a second CC, and $T_3$ indicates a third time gap before transmitting a third SRS on a third CC. $N_2^{\mu_c}$ and $T_{Retune-time}$ may correspond to values as described above. Each of $T_1$, $T_2$, and $T_3$ may be measured in OFDM symbols in relation to after receiving downlink signal 305-a.

In the case of reference signal timing gap configuration 300, CC 310-a may have a first numerology that includes a first slot length 315-a, and CC 310-b may have a second numerology that includes a second slot length 315-b. The order of the CCs 310 may be indicated in downlink signal 305-a from a network device 105 (e.g., a base station) or by higher signaling. A UE 115 may determine a first time gap 320-a based on the first numerology of CC 310-a and transmit a first SRS on a next available position after first time gap 320-a. The UE 115 may further determine a second time gap for transmitting a second SRS on CC 310-b based on the greater of time durations 325. UE 115-a may determine time duration 325-a based on first time gap 320-a, a duration of the first SRS, and a retune time. Additionally, the UE 115 may determine time duration 325-b based on the second numerology of CC 310-b. Since time duration 325-b is greater than time duration 325-a, the UE 115 may transmit a second SRS on CC 310-b on a next available position after time duration 325-b ends. Accordingly, time duration 325-b may be known as the second time gap.

If downlink signal 305-a includes a CSIRS, the UE 115 may compute first time gap 320-a and time duration 325-b (e.g., timing gaps associated with the numerologies) based on a time needed between a CSIRS and transmitting a CSF message if the SRS is associated with CSIRS (e.g., N3). Additionally or alternatively, the UE 115 may compute first time gap 320-a and time duration 325-b separately based on a time between receiving a PDCCH (e.g., downlink signal 305-a) to a respective SRS transmission (e.g., N4). In some cases, the durations of each SRS may vary for a respective CC 310 (e.g., 1, 2, or 4 OFDM symbols).

It is to be noted that while first slot length 315-a is twice the length of second slot length 315-b, the determined time gap based on the numerology for the respective CC 310 may not scale linearly (e.g., time duration 325-b may not be twice the length of first time gap 320-a). Additionally, the slots may not be aligned across slot lengths 315, but may be aligned at 1 ms intervals.

Figure 3B:
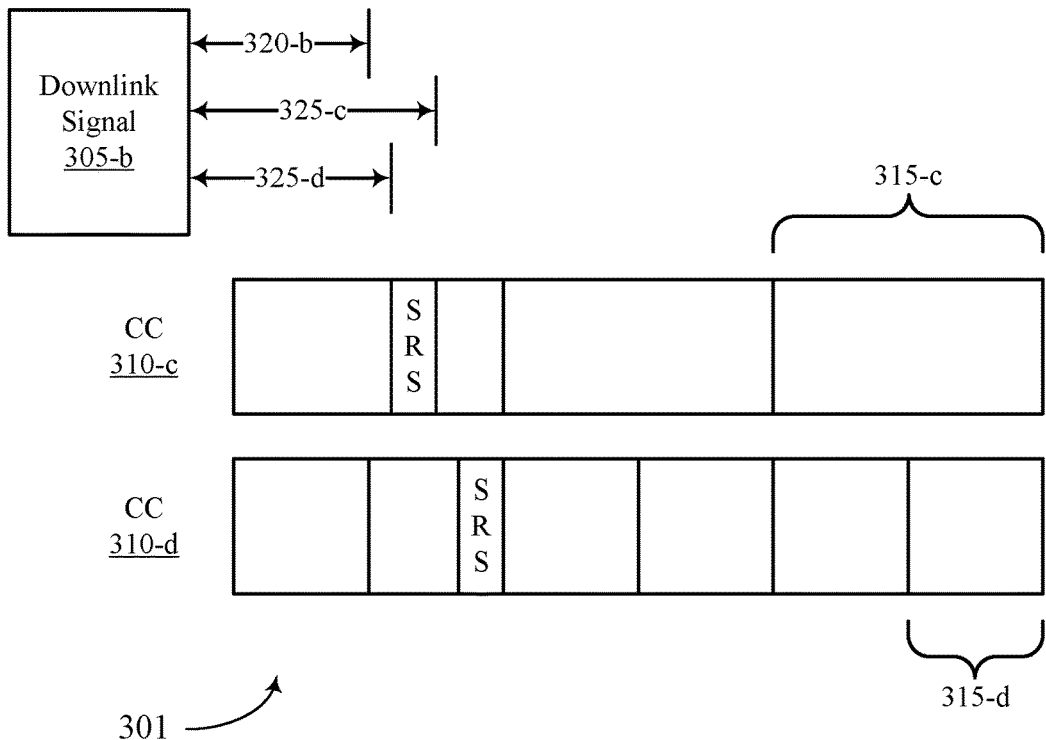

FIG. 3B illustrates an example of a reference signal timing gap configuration 301 that supports timing for reference signals in multiple numerology wireless communications in accordance with various aspects of the present disclosure. In some examples, reference signal timing gap configuration 301 may implement aspects of wireless communications systems 100 and 200. Reference signal timing gap configuration 301 may include a configuration for transmitting one or more SRSs on respective CCs with different determined timing gaps as described above with reference to FIGS. 1 and 2.

For an n-th aperiodic SRS transmission, where n≥1, on a cell c, upon detection of a positive SRS request on a grant (e.g., downlink signal 305-b), a UE 115 may start the corresponding SRS transmission provided it does not collide with any previous SRS transmissions triggered by the grant, or interruption due to uplink or downlink radio frequency retuning time ($T_{Retune-time}$), on the configured symbol of the first slot which is no earlier than any $N_2^{\mu_c}$ OFDM symbols after the last symbol of a PDCCH carrying the grant scheduling the SRS transmission, with $N_2^{\mu_c}$ based on the numerology $\mu_c$ used in cell c; and $T_{Retune-time}$ seconds after the previous SRS transmissions (if any) triggered by the grant. Otherwise, the n-th SRS transmission may be dropped.

In the case of reference signal timing gap configuration 301, CC 310-c may have a first numerology that includes a first slot length 315-c, and CC 310-d may have a second numerology that includes a second slot length 315-d. The order of the CCs 310 may be indicated in downlink signal 305-b from a network device 105 (e.g., a base station) or by higher signaling. A UE 115 may determine a first time gap 320-b based on the first numerology of CC 310-c and transmit a first SRS on a next available position after first time gap 320-b. The UE 115 may further determine a second time gap for transmitting a second SRS on CC 310-d based on the greater of time durations 325. UE 115-a may determine time duration 325-c based on first time gap 320-b, a duration of the first SRS, and a retune time. Additionally, the UE 115 may determine time duration 325-d based on the second numerology of CC 310-d. Since time duration 325-c is greater than time duration 325-d, the UE 115 may transmit a second SRS on CC 310-d on a next available position after time duration 325-c ends. Accordingly, time duration 325-c may be known as the second time gap.

If downlink signal 305-b includes a CSIRS, the UE 115 may compute first time gap 320-b and time duration 325-d (e.g., timing gaps associated with the numerologies) based on a time needed between a CSIRS and transmitting a CSF message if the SRS is associated with CSIRS (e.g., N3). Additionally or alternatively, the UE 115 may compute first time gap 320-b and time duration 325-d separately based on a time between receiving a PDCCH (e.g., downlink signal 305-a) to a respective SRS transmission (e.g., N4). In some cases, the durations of each SRS may vary for a respective CC 310 (e.g., 1, 2, or 4 OFDM symbols).

It is to be noted that while first slot length 315-c is twice the length of second slot length 315-d, the determined time gap based on the numerology for the respective CC 310 may not scale linearly (e.g., time duration 325-d may not be twice the length of first time gap 320-b). Additionally, the slots may not be aligned across slot lengths 315, but may be aligned at 1 ms intervals.

Figure 4:
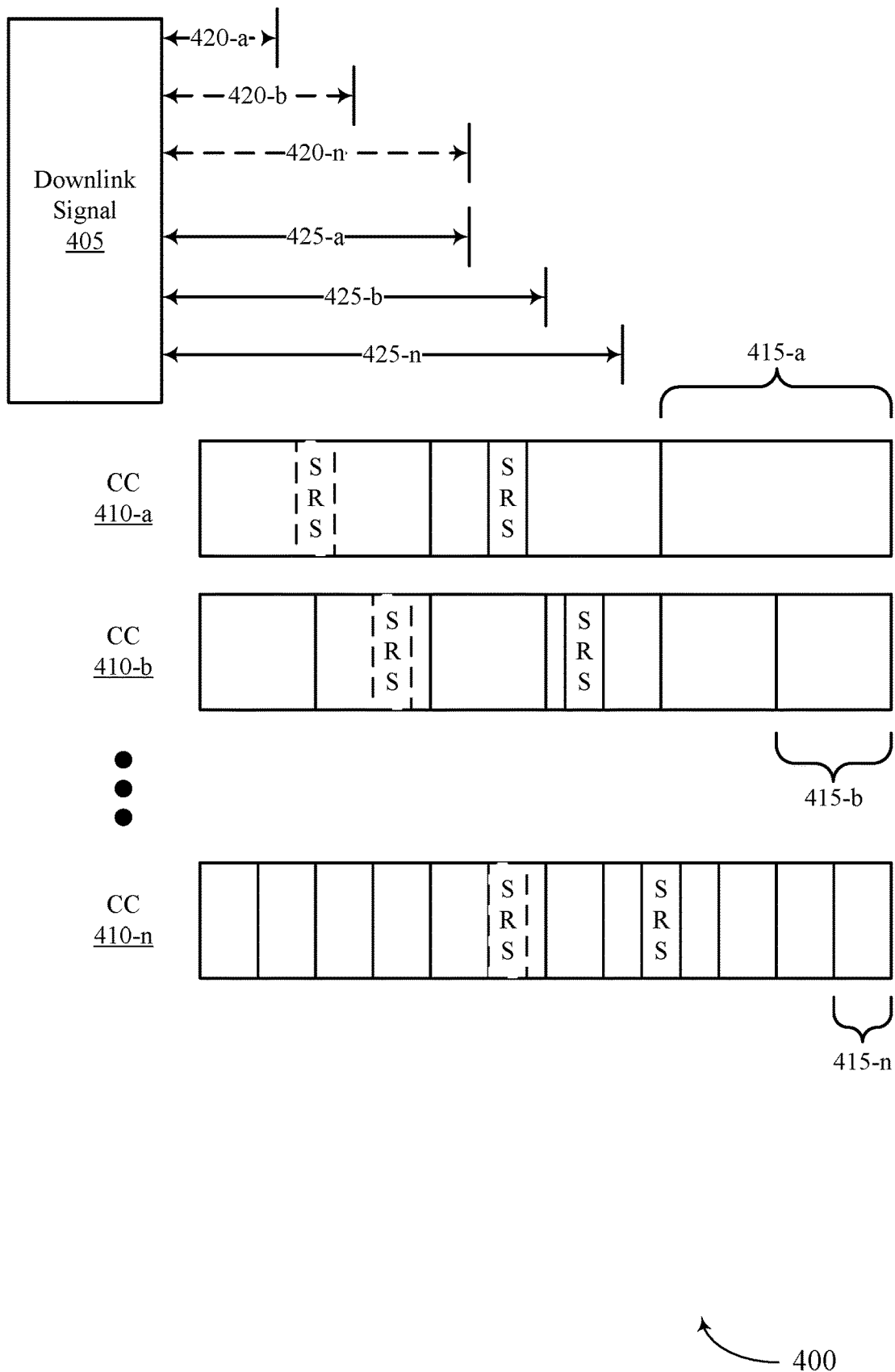
FIG. 4 illustrates an example of a reference signal transmission scheme that supports timing for reference signals in multiple numerology wireless communications in accordance with one or more aspects of the present disclosure.

FIG. 4 illustrates an example of a reference signal transmission scheme 400 that supports timing for reference signals in multiple numerology wireless communications in accordance with various aspects of the present disclosure. In some examples, reference signal transmission scheme 400 may implement aspects of wireless communications systems 100 and 200. Reference signal transmission scheme 400 may include a scheme for transmitting one or more SRSs on respective CCs with different determined timing gaps as described above with reference to FIGS. 1 and 2, where the timing gaps are based on an overall maximum timing gap value for all CCs.

For an n-th aperiodic SRS transmission, where n≥1, on a cell c, upon detection of a positive SRS request on a grant (e.g., downlink signal 405), a UE 115 may start the corresponding SRS transmission provided it does not collide with any previous SRS transmissions triggered by the grant or cause interruption due to uplink or downlink radio frequency retuning time ($T_{Retune-time}$), on the configured symbol of the first slot which is no earlier than any $$N_2^{\mu_{c_1}}, N_2^{\mu_{c_2}}, \ldots, N_2^{\mu_{c_n}}$$

OFDM symbols, with $$N_2^{\mu_{c_n}}$$

based on the numerology $\mu_{c_n}$ used in cell $c_n$, after the last symbol of the PDCCH carrying the grant scheduling the SRS transmission; and $T_{Retune-time}$ seconds after the previous SRS transmissions (if any) triggered by the grant. Otherwise, the n-th SRS transmission may be dropped.

In the case of reference signal transmission scheme 400, CC 410-a may have a first numerology that includes a first slot length 415-a, CC 410-b may have a second numerology that includes a second slot length 415-b, and CC 410-n may have an n-th numerology that includes an n-th slot length 415-n. The order of the CCs 410 for transmitting SRSs may be indicated in downlink signal 305-b from a network device 105 (e.g., a base station) or by higher signaling. A UE 115 may first determine respective time gaps 420 for each CC 410 based on the numerology for each CC 410. For example, the UE 115 may determine time gap 420-*a* based on the first numerology of CC 410-*a*, time gap 420-*b* based on the second numerology of CC 410-*b*, and time gap 420-*n* based on the n-th numerology of CC 410-*n*. However, the UE 115 may transmit the first SRS on CC 410-*a* according to the maximum of the time gaps 420. Since time gap 420-*n* is the largest, the UE 115 may transmit the first SRS on CC 410-*a* after a time duration 425-*a*, which corresponds to time gap 420-*n*.

The UE 115 may then determine time durations for the subsequent SRSs based on the previous time duration, a duration of the transmitted SRS, and a retune time. For example, the UE 115 may determine a time duration 425-*b* for transmitting a second SRS on CC 410-*b* based on time duration 425-*a*, the duration of the first SRS transmitted in CC 410-*a*, and a retune time. Additionally, if the n-th SRS transmitted is the third SRS, the UE 115 may determine a time duration 425-*n* for transmitting the n-th SRS on CC 410-*n* based on time duration 425-*b*, the duration of the second SRS transmitted in CC 410-*b*, and a retune time.

As described previously, if downlink signal 405 includes a CSIRS, the UE 115 may compute the time gaps 420 based on a time needed between a CSIRS and transmitting a CSF message if the SRS is associated with CSIRS (e.g., N3). Additionally or alternatively, the UE 115 may compute the time gaps 420 separately based on a time between receiving a PDCCH (e.g., downlink signal 405) to a respective SRS transmission (e.g., N4). In some cases, the durations of each SRS may vary for a respective CC 410 (e.g., 1, 2, or 4 OFDM symbols).

As noted above, the determined time gaps 420 may not scale linearly with slot lengths 415. Additionally, the slots may not be aligned across slot lengths 415, but may be aligned at 1 ms intervals.

Figure 5:
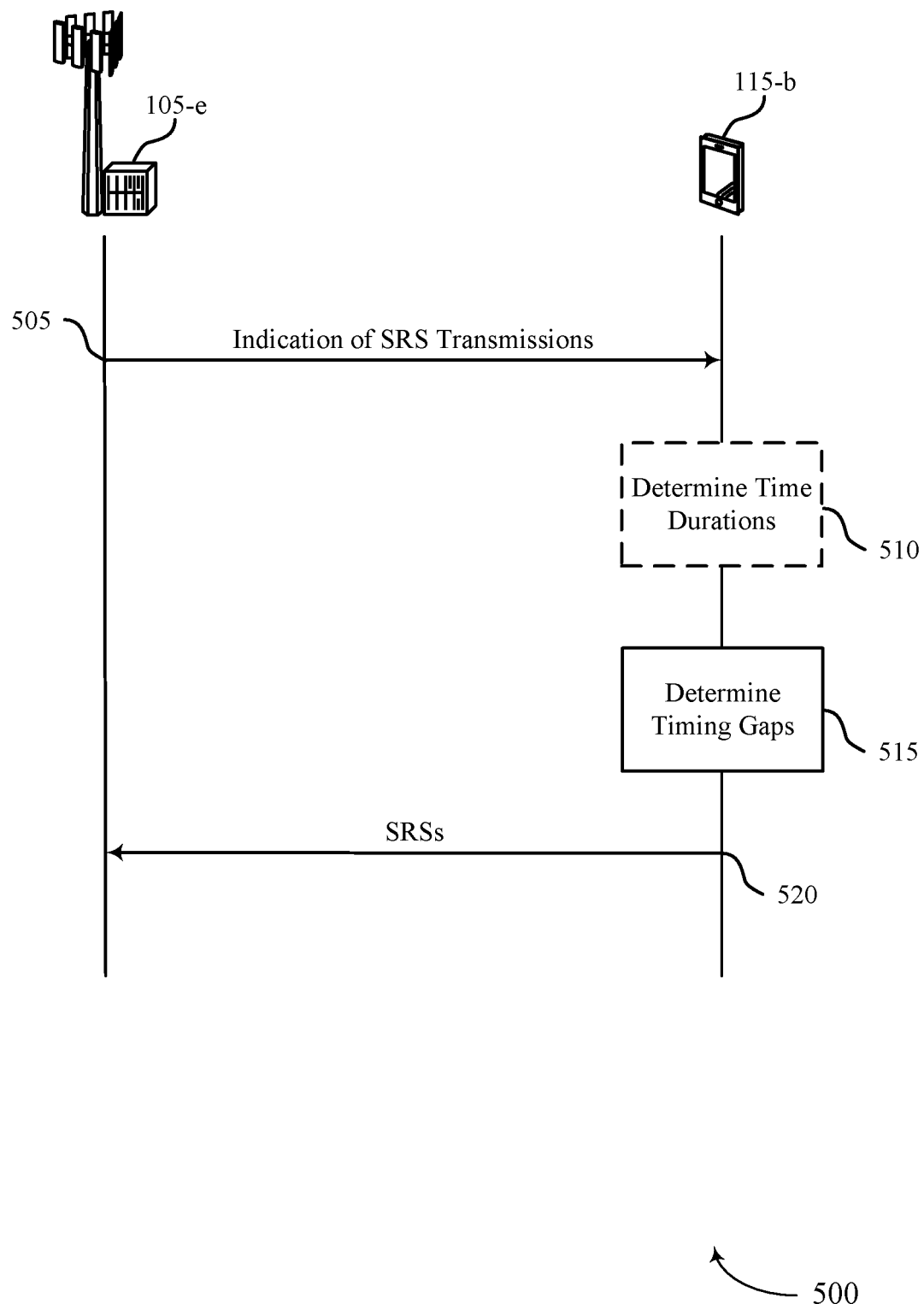
FIG. 5 illustrates an example of a process flow that supports timing for reference signals in multiple numerology wireless communications in accordance with one or more aspects of the present disclosure.

FIG. 5 illustrates an example of a process flow 500 that supports timing for reference signals in multiple numerology wireless communications in accordance with various aspects of the present disclosure. In some examples, process flow 500 may implement aspects of wireless communications systems 100 and 200. Process flow 500 may include a network device 105-*e* (e.g., a base station) and UE 115-*b*, which may be examples of corresponding devices as described with reference to FIGS. 1-4. Network device 105-*e* may indicate for UE 115-*b* to transmit one or more SRSs on respective CCs of a carrier, where the different CCs may include different numerologies. Accordingly, network device 105-*e* may communicate on a different cell (e.g., switch antennas in a carrier) based on the transmitted SRSs.

In the following description of the process flow 500, the operations between network device 105-*e* and UE 115-*b* may be performed in different orders or at different times. Certain operations may also be left out of the process flow 500, or other operations may be added to the process flow 500. It is to be understood that while network device 105-*e* and UE 115-*b* are shown performing a number of the operations of process flow 500, any wireless device may perform the operations shown.

At 505, UE 115-*b* may receive, from network device 105-*e*, an indication for transmission of a first SRS on a first CC and a second SRS on a second CC, where the first CC is associated with a first numerology and the second CC is associated with a second numerology different from the first numerology. Additionally, UE 115-*b* may receive an indication for transmission of a third SRS on a third CC associated with a third numerology different from the first and second numerologies. UE 115-*b* may further receive an indication for transmission of additional SRSs on respective CCs. In some cases, the indication may include a grant scheduling the first and second SRS transmissions and may be received via a PDCCH. Alternatively, the indication may include a CSIRS.

At 510, UE 115-*b* may determine a first time duration corresponding to a first number of symbols associated with the first numerology. In some cases, the first number of symbols may correspond to a time between receipt of an uplink grant and transmission of uplink data for the first numerology, a time between receipt of a CSIRS and transmission of a CSF message for the first numerology, or a time between receipt of a PDCCH message and transmission of the first SRS for the first numerology. Additionally, UE 115-*b* may determine a second time duration corresponding to a second number of symbols associated with the second numerology. In some cases, the second time duration may be determined based on a retune time associated with retuning from the first CC to the second CC and a transmission time associated with transmission of the first SRS on the first CC. Additionally or alternatively, the second number of symbols may correspond to a time between receipt of an uplink grant and transmission of uplink data for the second numerology, a time between receipt of a CSIRS and transmission of a CSF message for the second numerology, or a time between receipt of a PDCCH message and transmission of the second SRS for the second numerology. When an indication for transmission of the third SRS is received, UE 115-*b* may further determine a third time duration corresponding to a third number of symbols associated with the third numerology.

At 515, UE 115-*b* may determine a first timing gap between receipt of the indication and transmission of the first SRS on the first CC based on the first numerology and determine a timing for transmission of the second SRS on the second CC (e.g., a second timing gap) after receipt of the indication and after the transmission of the first SRS on the first CC based on the first timing gap and the second numerology. In some cases, the first timing gap may be determined based on the first time duration determined at 510. Similarly, the timing for transmission of the second SRS may be determined based on the second time duration determined at 510. Additionally, UE 115-*b* may determine a timing for transmission of the third SRS on the third CC (e.g., a third timing gap) after receipt of the indication and after the transmission of the second SRS based on the second timing gap and the third and the third numerology.

In some cases, UE 115-*b* may determine the timing for the transmission of the second SRS on the second CC based on the first timing gap. Accordingly, the first timing gap may be determined based on the determined first and second time durations at 510. Additionally, the timing for the transmission of the second SRS may be determined based on a retune time associated with retuning from the first CC to the second CC and a transmission time associated with transmission of the first SRS on the first CC. When the indication for transmission of the third SRS is received, UE 115-*b* may determine the first timing gap based on the first, second, and third time durations. UE 115-*b* may further determine a timing for transmission of the third SRS on the third CC after transmission of the second SRS on the second CC based on the timing for the transmission of the second SRS. When the indication for transmission of additional SRSs on respective CCs is received, UE 115-*b* may determine respective transmission timings for the additional SRSs based on numerologies associated with the respective CCs. Additionally or alternatively, UE 115-*b* may determine additional time durations corresponding to respective numbers of symbols associated with the respective numerologies, where the first timing gap is determined based on the additional time durations.

At 520, UE 115-*b* may transmit the first SRS based on the first timing gap and the second SRS based on the timing for the transmission of the second SRS determined at 515. Additionally, when the indication for transmission of the third SRS is received, UE 115-*b* may transmit the third SRS based on the timing for the transmission of the third SRS. Similarly, when the indication for transmission of additional SRSs on respective CCs is received, UE 115-*b* may transmit the additional SRSs on respective CCs based on the respective transmission timings. Accordingly, network device 105-*e* may receive, after the first timing gap, the first SRS on the first CC, and receive, after the transmission timing for the second SRS, the second SRS on the second CC. Additionally, network device 105-*e* may receive, after the transmission timing for the third SRS, the third SRS on the third CC.

Figure 6:
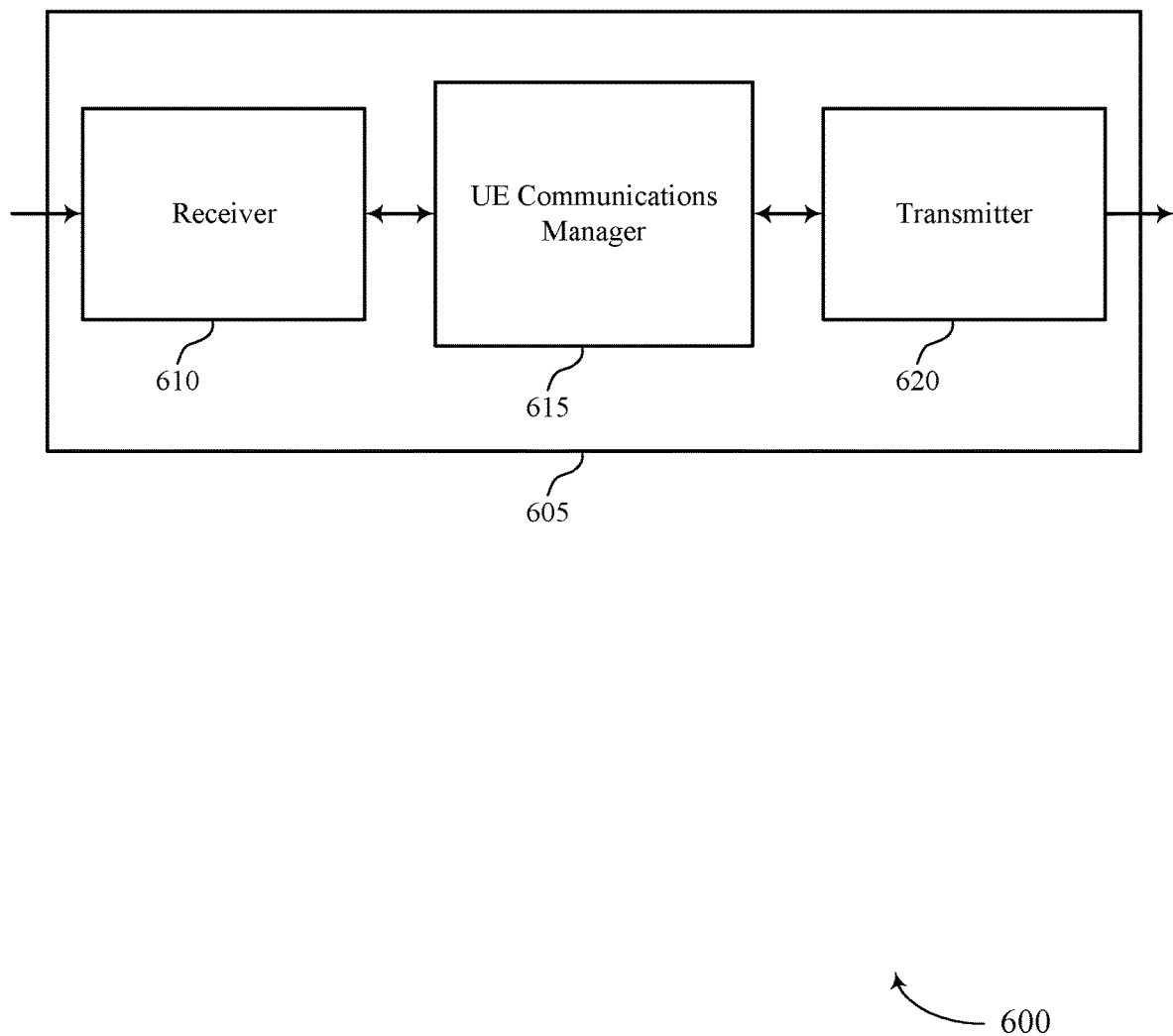
FIGS. 6 through 8 show block diagrams of a device that supports timing for reference signals in multiple numerology wireless communications in accordance with aspects of the present disclosure.

FIG. 6 shows a block diagram 600 of a wireless device 605 that supports timing for reference signals in multiple numerology wireless communications in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to timing for reference signals in multiple numerology wireless communications, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 615 may receive, from a network device 105 (e.g., a base station), an indication for transmission of a first SRS on a first CC and a second SRS on a second CC, where the first CC is associated with a first numerology and the second CC is associated with a second numerology different from the first numerology. In some cases, UE communications manager 615 may determine a first timing gap between receipt of the indication and transmission of the first SRS on the first CC based on the first numerology. Additionally, UE communications manager 615 may determine a timing for transmission of the second SRS on the second CC after receipt of the indication and after the transmission of the first SRS on the first CC based on the first timing gap and the second numerology. Accordingly, UE communications manager 615 may transmit the first SRS based on the first timing gap and the second SRS based on the timing for the transmission of the second SRS. Additionally or alternatively, UE communications manager 615 may determine a first timing gap between receipt of the indication and transmission of the first SRS on the first CC based on the first numerology and the second numerology. In some cases, UE communications manager 615 may also determine a timing for transmission of the second SRS on the second CC after receipt of the indication and after the transmission of the first SRS on the first CC based on the first timing gap.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
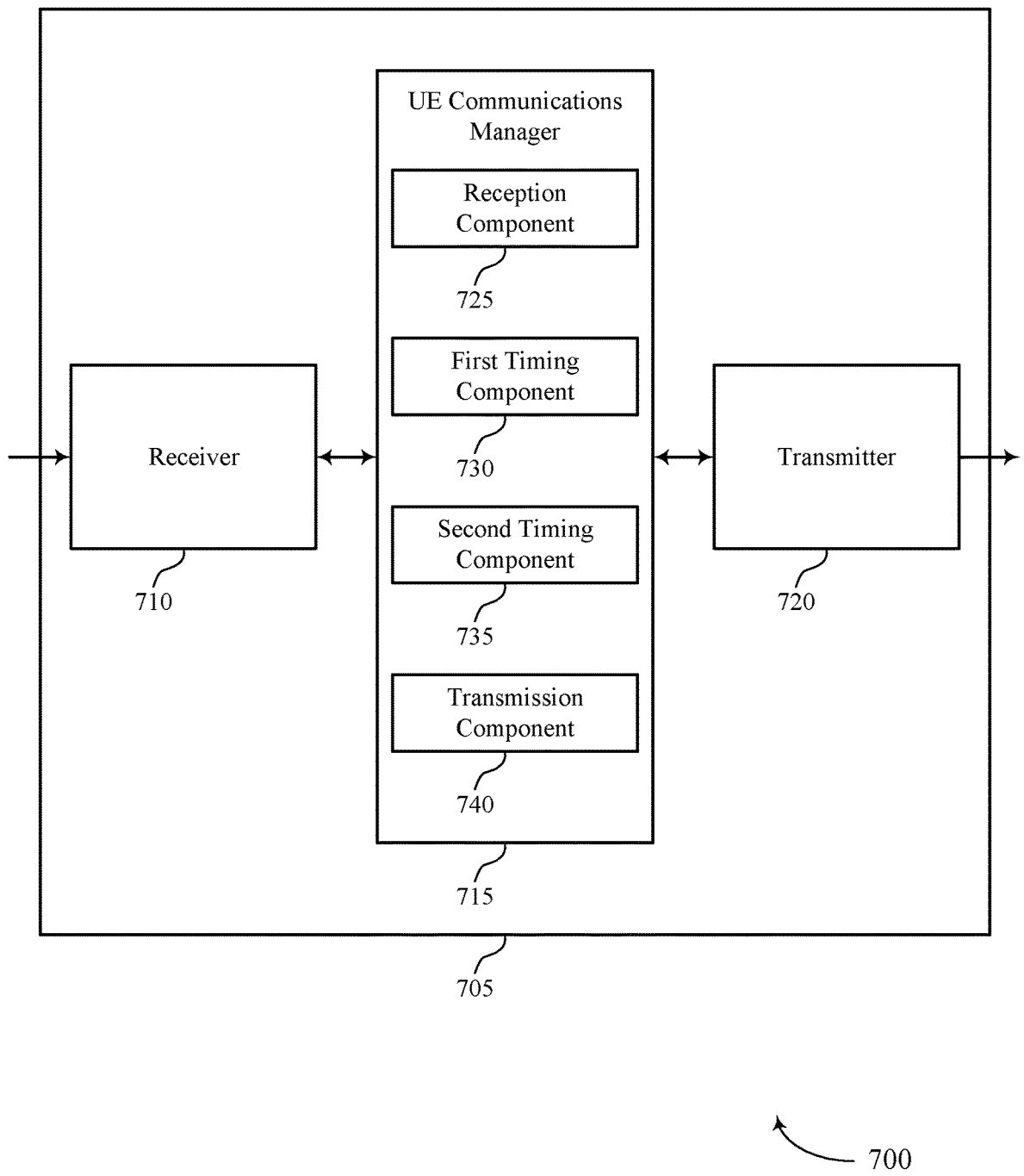

FIG. 7 shows a block diagram 700 of a wireless device 705 that supports timing for reference signals in multiple numerology wireless communications in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to timing for reference signals in multiple numerology wireless communications, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include reception component 725, first timing component 730, second timing component 735, and transmission component 740.

Reception component 725 may receive, from a network device 105 (e.g., a base station), an indication for transmission of a first SRS on a first CC and a second SRS on a second CC, where the first CC is associated with a first numerology and the second CC is associated with a second numerology different from the first numerology. In some cases, receiving the indication may include receiving an indication for transmission of a third SRS on a third CC associated with a third numerology different from the first and second numerologies. Additionally or alternatively, receiving the indication may include receiving an indication for transmission of additional SRSs on respective CCs. In some cases, the indication may include a grant scheduling the first and second SRS transmissions and is received via a PDCCH. Additionally or alternatively, the indication may include a CSIRS.

First timing component 730 may determine a first timing gap between receipt of the indication and transmission of the first SRS on the first CC based on the first numerology and/or the second numerology. In some cases, first timing component 730 may determine a first time duration associated with the first numerology, determine a second time duration associated with the second numerology, and determine a maximum of the first time duration and the second time duration.

Second timing component 735 may determine a timing for transmission of the second SRS on the second CC after receipt of the indication and after the transmission of the first SRS on the first CC based on the first timing gap and/or the second numerology. In some cases, second timing component 735 may determine the timing for transmission of the second SRS based on a retune time associated with retuning from the first CC to the second CC and a transmission time associated with transmission of the first SRS on the first CC.

Transmission component 740 may transmit the first SRS based on the first timing gap, transmit the second SRS based on the timing for the transmission of the second SRS, transmit the third SRS based on the timing for the transmission of the third SRS, transmit the additional SRSs on respective CCs based on the respective transmission timings, or a combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
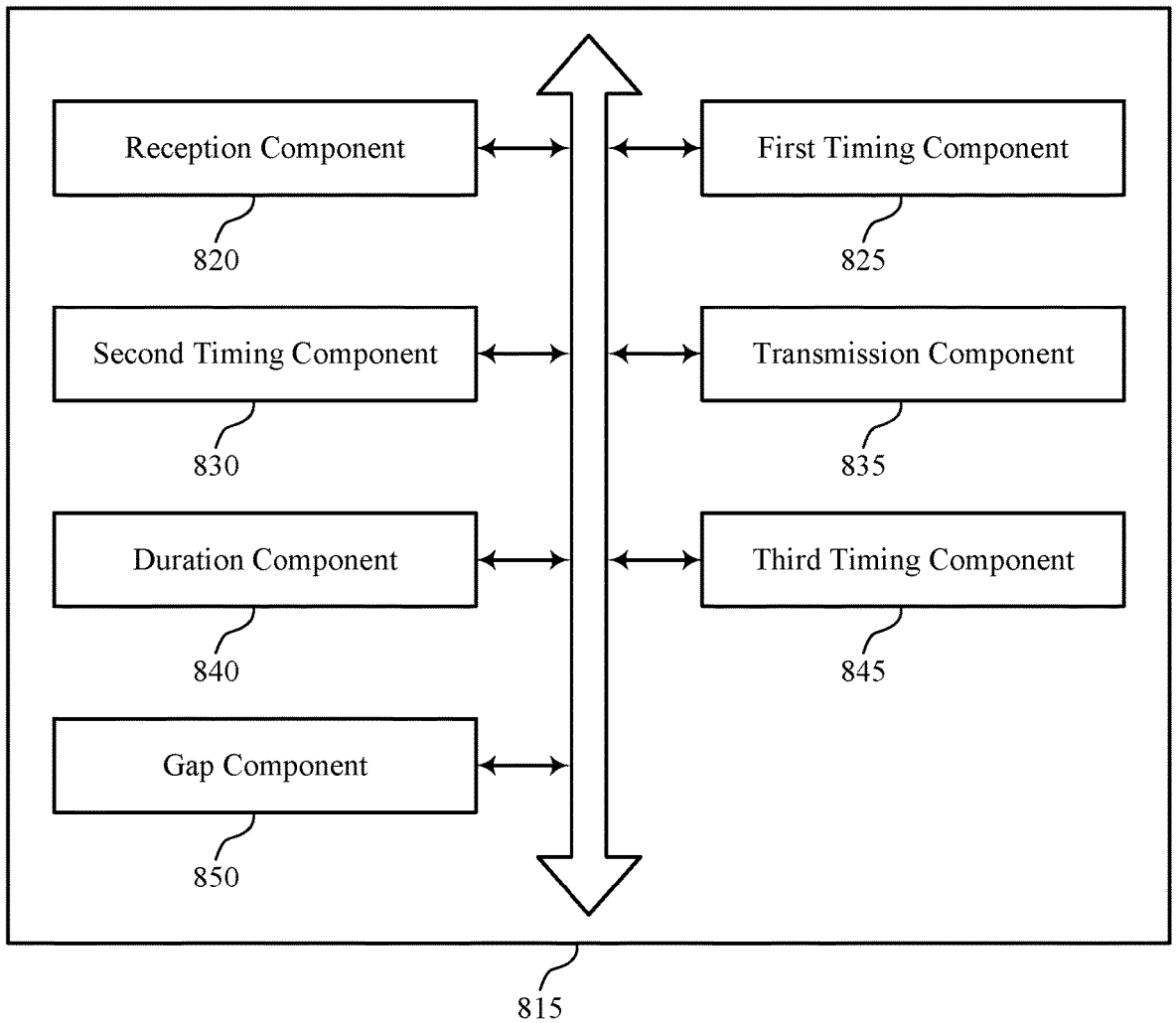

FIG. 8 shows a block diagram 800 of a UE communications manager 815 that supports timing for reference signals in multiple numerology wireless communications in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include reception component 820, first timing component 825, second timing component 830, transmission component 835, duration component 840, third timing component 845, and gap component 850. Each of these modules may communicate, directly or indirectly, with one another (e.g., via one or more buses).

Reception component 820 may receive, from a network device 105 (e.g., a base station), an indication for transmission of a first SRS on a first CC and a second SRS on a second CC, where the first CC is associated with a first numerology and the second CC is associated with a second numerology different from the first numerology. In some cases, receiving the indication may include receiving an indication for transmission of a third SRS on a third CC associated with a third numerology different from the first and second numerologies. Additionally or alternatively, receiving the indication may include receiving an indication for transmission of additional SRSs on respective CCs, which may be associated with respective numerologies. In some cases, the indication may include a grant scheduling the first and second SRS transmissions and is received via a PDCCH. Additionally or alternatively, the indication includes a CSIRS.

First timing component 825 may determine a first timing gap between receipt of the indication and transmission of the first SRS on the first CC based on the first numerology and/or the second numerology. In some cases, first timing component 825 may determine a first time duration associated with the first numerology, determine a second time duration associated with the second numerology, and determine a maximum of the first time duration and the second time duration.

Second timing component 830 may determine a timing for the transmission of the second SRS on the second CC after receipt of the indication and after the transmission of the first SRS on the first CC based on the first timing gap and/or the second numerology. In some cases, second timing component 830 may determine the timing for the transmission of the second SRS based on a retune time associated with retuning from the first CC to the second CC and a transmission time associated with transmission of the first SRS on the first CC.

Transmission component 835 may transmit the first SRS based on the first timing gap, transmit the second SRS based on the timing for the transmission of the second SRS, transmit the third SRS based on the timing for the transmission of the third SRS, transmit the additional SRSs on respective CCs based on the respective transmission timings, or a combination thereof.

Duration component 840 may determine a first time duration corresponding to a first number of symbols associated with the first numerology, where the first timing gap is determined based on the first time duration. Additionally, duration component 840 may determine additional time durations corresponding to respective numbers of symbols associated with the respective numerologies, where the first timing gap is determined based on the additional time durations. In some cases, duration component 840 may determine a second time duration corresponding to a second number of symbols associated with the second numerology, where the timing for the transmission of the second SRS is determined based on the first time duration and the second time duration. Additionally or alternatively, duration component 840 may determine the second time duration based on a retune time associated with retuning from the first CC to the second CC and a transmission time associated with transmission of the first SRS on the first CC.

In some cases, duration component 840 may determine a first time duration corresponding to a first number of symbols associated with the first numerology, determine a second time duration corresponding to a second number of symbols associated with the second numerology, and determine a third time duration corresponding to a third number of symbols associated with the third numerology, where the first timing gap is determined based on the first, second, and third time durations. Additionally, duration component 840 may determine a second time duration corresponding to a second number of symbols associated with the second numerology, where the first timing gap is determined based on the first and second time durations. In some cases, the second number of symbols may correspond to a time between receipt of an uplink grant and transmission of uplink data for the second numerology, a time between receipt of a C SIRS and transmission of a CSF message for the second numerology, or a time between receipt of a PDCCH message and transmission of the second SRS for the second numerology. Additionally, the first number of symbols may correspond to a time between receipt of an uplink grant and transmission of uplink data for the first numerology, a time between receipt of a CSIRS and transmission of a CSF message for the first numerology, or a time between receipt of a PDCCH message and transmission of the first SRS for the first numerology.

Third timing component 845 may determine a timing for the transmission of the third SRS after receipt of the indication for transmission of the third SRS on the third CC and after the transmission of the second SRS based on the second timing gap and the third numerology. Additionally or alternatively, third timing component 845 may determine a timing for the transmission of the third SRS after receipt of the indication for transmission of the third SRS on the third CC and after the transmission of the second SRS on the second CC based on the timing for the transmission of the second SRS.

Gap component 850 may determine respective transmission timings (e.g., timing gaps) for the additional SRSs based on numerologies associated with the respective CCs.

Figure 9:
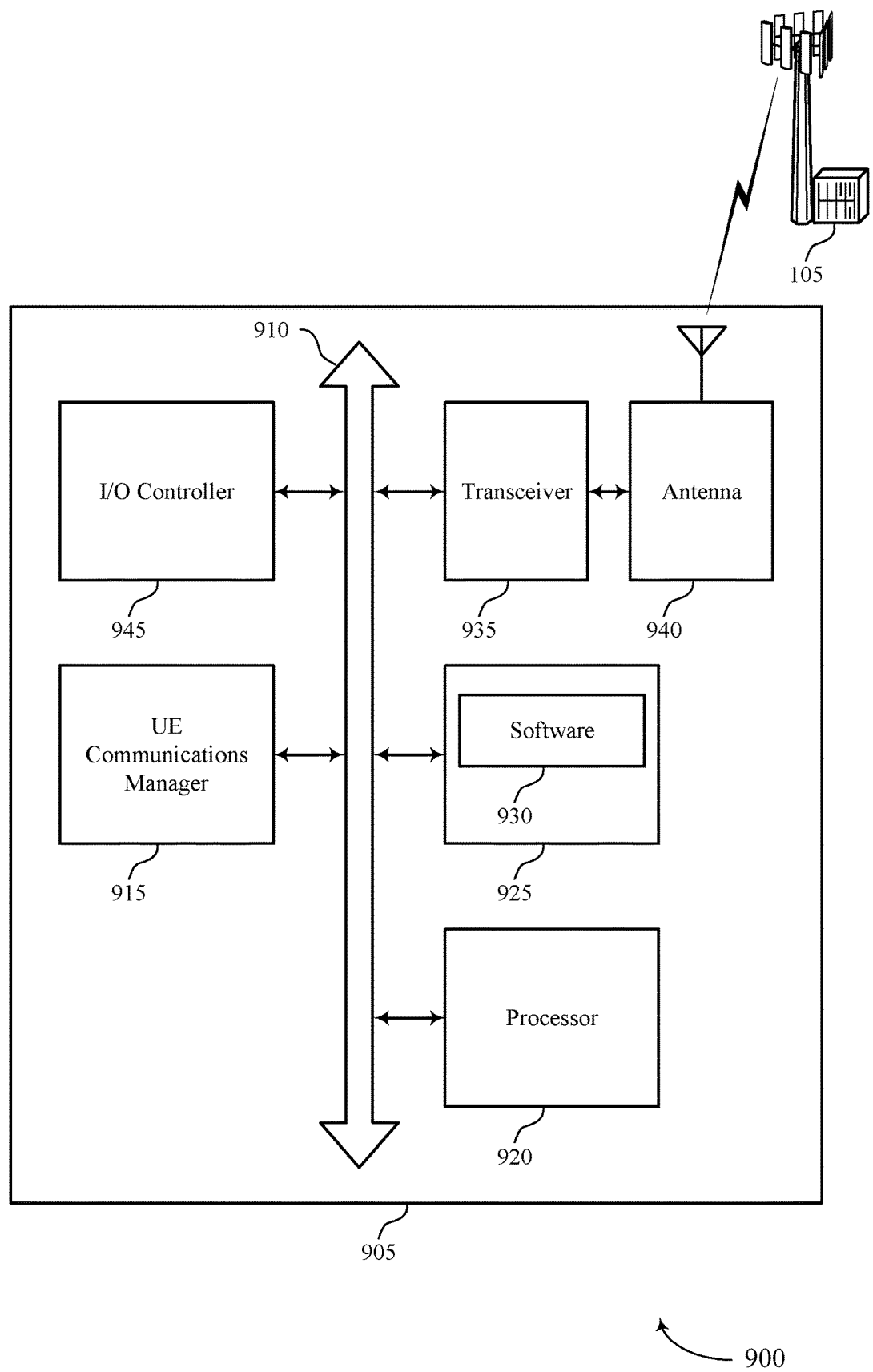
FIG. 9 illustrates a block diagram of a system including a UE that supports timing for reference signals in multiple numerology wireless communications in accordance with aspects of the present disclosure.

FIG. 9 shows a diagram of a system 900 including a device 905 that supports timing for reference signals in multiple numerology wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more network devices 105 (e.g., base stations).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting timing for reference signals in multiple numerology wireless communications).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic I/O system (BIOS) which may control basic hardware or software operation such as the interaction with peripheral components or devices.

Software 930 may include code to implement aspects of the present disclosure, including code to support timing for reference signals in multiple numerology wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
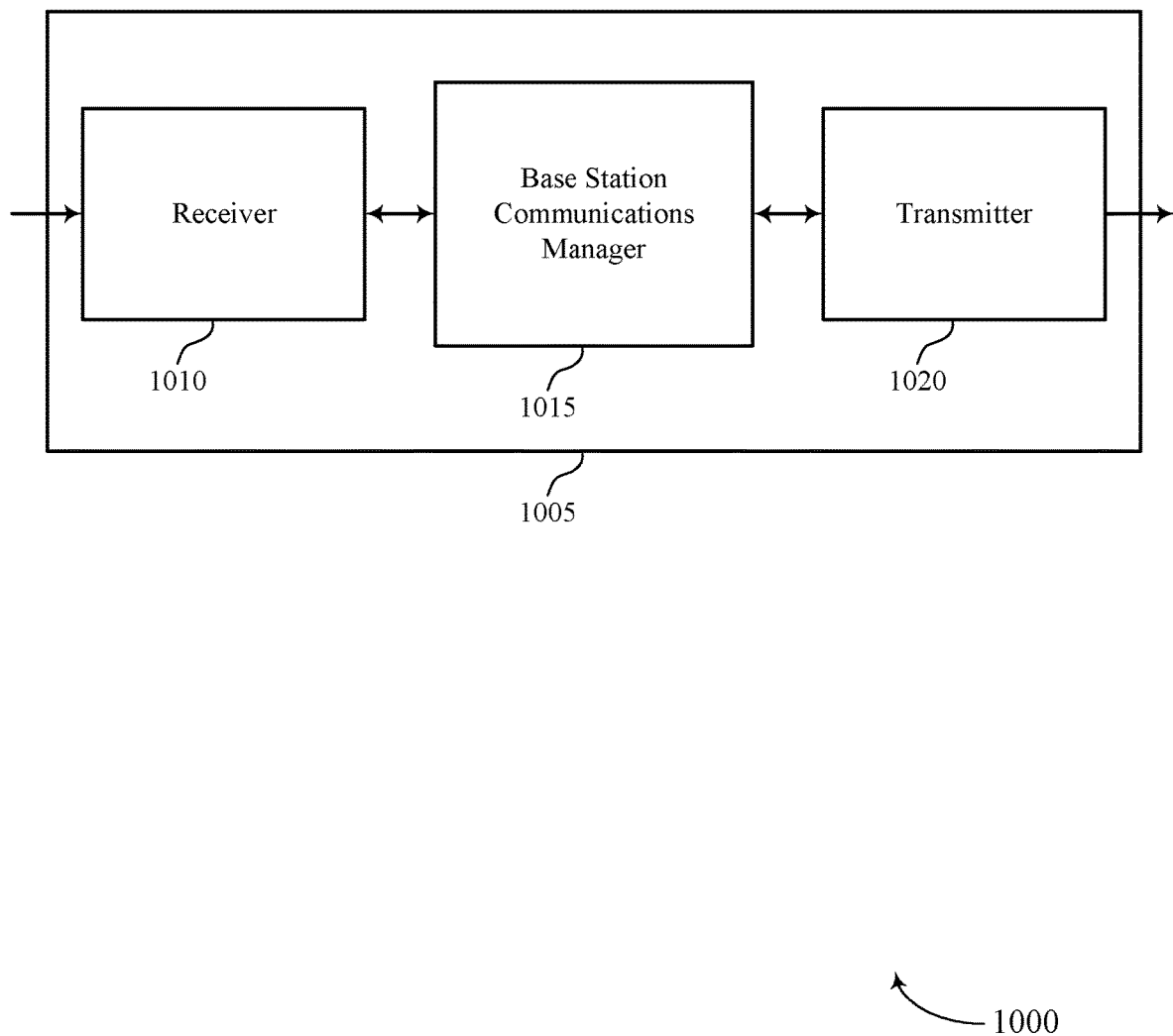
FIGS. 10 through 12 show block diagrams of a device that supports timing for reference signals in multiple numerology wireless communications in accordance with aspects of the present disclosure.

FIG. 10 shows a block diagram 1000 of a wireless device 1005 that supports timing for reference signals in multiple numerology wireless communications in accordance with aspects of the present disclosure. Wireless device 1005 may be an example of aspects of a network device 105 (e.g., a base station) as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to timing for reference signals in multiple numerology wireless communications, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit, to a UE 115, an indication for transmission of a first SRS on a first CC and a second SRS on a second CC, where the first CC is associated with a first numerology and the second CC is associated with a second numerology different from the first numerology. Base station communications manager 1015 may receive, after a first timing gap based on the first numerology, the first SRS on the first CC. Base station communications manager 1015 may receive, after a transmission timing for the second SRS based on the first timing gap, the second SRS on the second CC.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
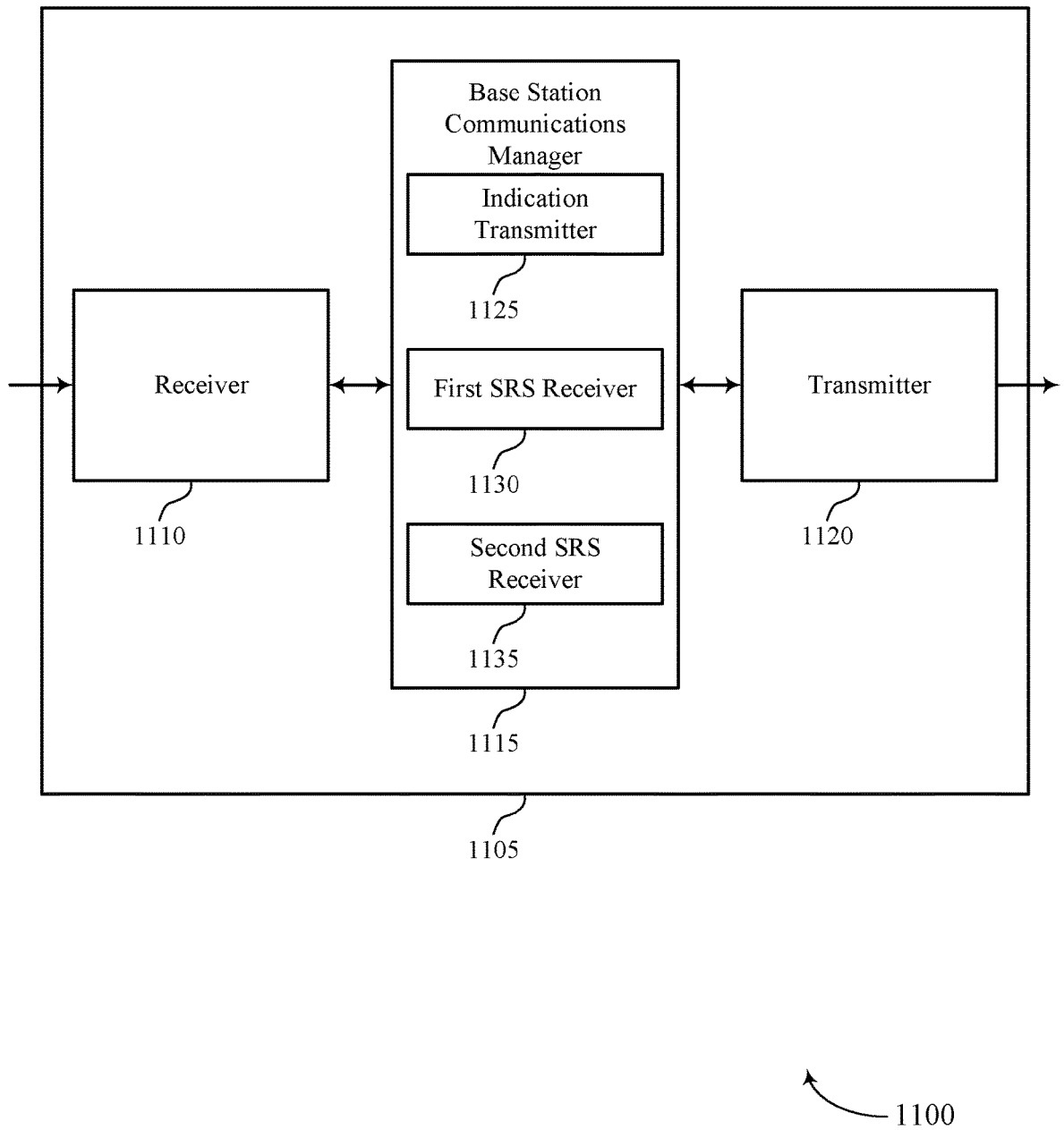

FIG. 11 shows a block diagram 1100 of a wireless device 1105 that supports timing for reference signals in multiple numerology wireless communications in accordance with aspects of the present disclosure. Wireless device 1105 may be an example of aspects of a wireless device 1005 or a network device 105 (e.g., a base station) as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to timing for reference signals in multiple numerology wireless communications, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include indication transmitter 1125, first SRS receiver 1130, and second SRS receiver 1135.

Indication transmitter 1125 may transmit, to a UE 115, an indication for transmission of a first SRS on a first CC and a second SRS on a second CC, where the first CC is associated with a first numerology and the second CC is associated with a second numerology different from the first numerology. In some cases, transmitting the indication may include transmitting an indication for transmission of a third SRS on a third CC associated with a third numerology different from the first and second numerologies. Additionally, the indication may include a grant scheduling the first and second SRS transmissions and is transmitted via a PDCCH. In some cases, the indication may include a CSIRS.

First SRS receiver 1130 may receive, after a first timing gap based on the first numerology, the first SRS on the first CC. In some cases, the first timing gap may be based on a first number of symbols associated with the first numerology. Additionally or alternatively, the first timing gap may be based on the second numerology.

Second SRS receiver 1135 may receive, after a transmission timing for the second SRS based on the first timing gap, the second SRS on the second CC. In some cases, the transmission timing for the second SRS may be based on a second number of symbols associated with the second numerology. Additionally or alternatively, the second timing gap may be based on a retune time associated with retuning from the first CC to the second CC and a transmission time associated with transmission of the first SRS on the first CC.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
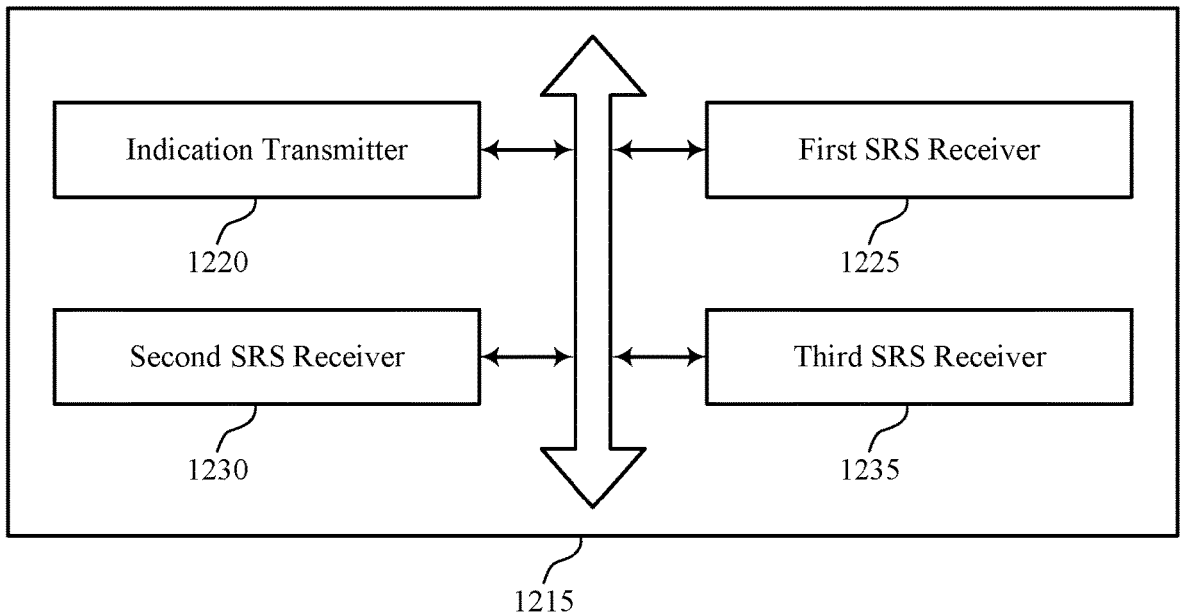

FIG. 12 shows a block diagram 1200 of a base station communications manager 1215 that supports timing for reference signals in multiple numerology wireless communications in accordance with aspects of the present disclosure. The base station communications manager 1215 may be an example of aspects of a base station communications manager 1315 described with reference to FIGS. 10, 11, and 13. The base station communications manager 1215 may include indication transmitter 1220, first SRS receiver 1225, second SRS receiver 1230, and third SRS receiver 1235. Each of these modules may communicate, directly or indirectly, with one another (e.g., via one or more buses).

Indication transmitter 1220 may transmit, to a UE, an indication for transmission of a first SRS on a first CC and a second SRS on a second CC, where the first CC is associated with a first numerology and the second CC is associated with a second numerology different from the first numerology. In some cases, transmitting the indication may include transmitting an indication for transmission of a third SRS on a third CC associated with a third numerology different from the first and second numerologies. Additionally, the indication may include a grant scheduling the first and second SRS transmissions and is transmitted via a PDCCH. In some cases, the indication may include a CSIRS.

First SRS receiver 1225 may receive, after a first timing gap based on the first numerology, the first SRS on the first CC. In some cases, the first timing gap may be based on a first number of symbols associated with the first numerology. Additionally or alternatively, the first timing gap may be based on the second numerology.

Second SRS receiver 1230 may receive, after a transmission timing for the second SRS based on the first timing gap, the second SRS on the second CC. In some cases, the transmission timing for the second SRS may be based on a second number of symbols associated with the second numerology. Additionally or alternatively, the second timing gap may be based on a retune time associated with retuning from the first CC to the second CC and a transmission time associated with transmission of the first SRS on the first CC.

Third SRS receiver 1235 may receive, after a transmission timing for the third SRS based on the transmission timing for the second SRS, the third SRS on the third CC.

Figure 13:
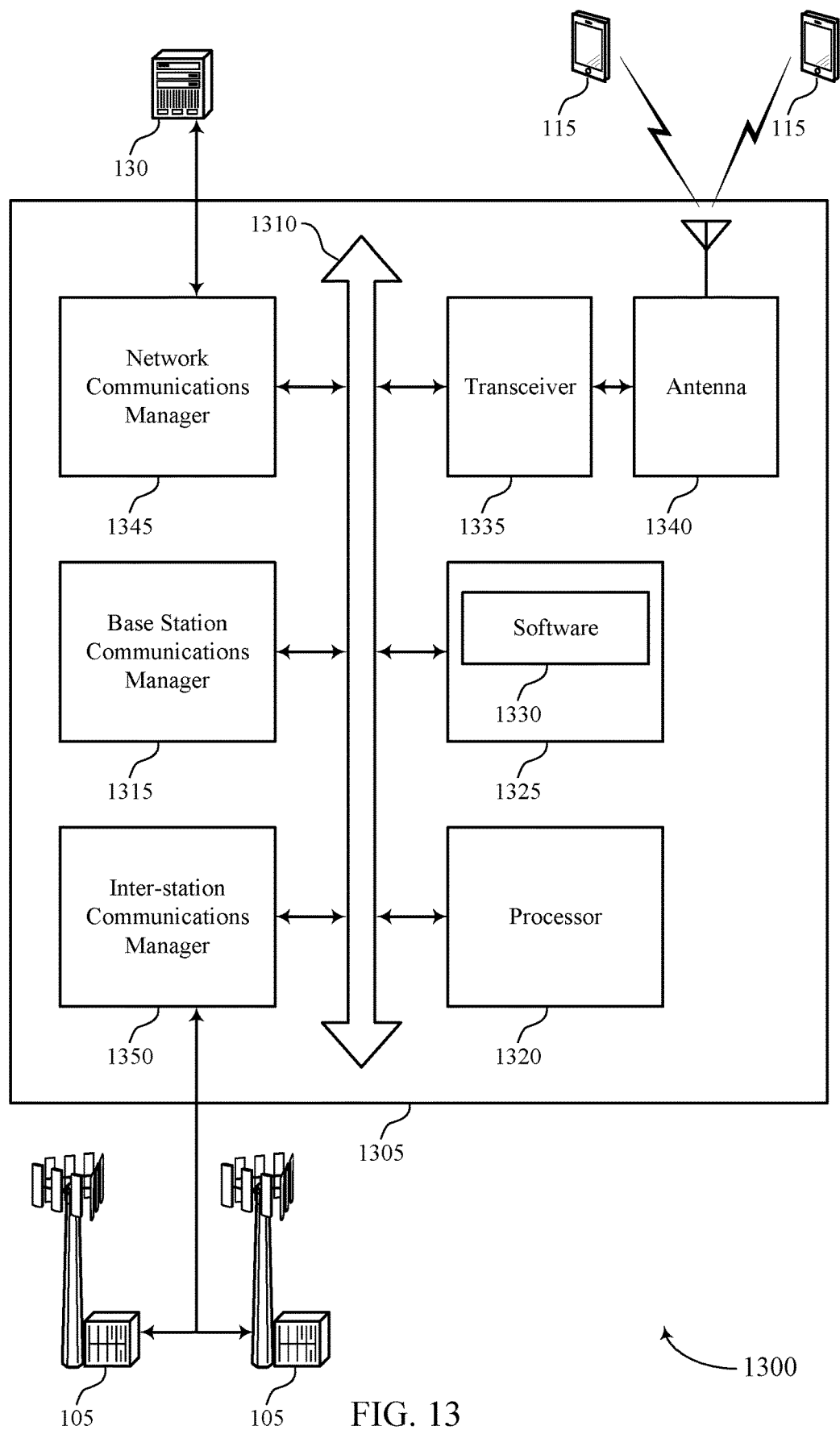
FIG. 13 illustrates a block diagram of a system including a base station that supports timing for reference signals in multiple numerology wireless communications in accordance with aspects of the present disclosure.

FIG. 13 shows a diagram of a system 1300 including a device 1305 that supports timing for reference signals in multiple numerology wireless communications in accordance with aspects of the present disclosure. Device 1305 may be an example of or include the components of network device 105 (e.g., a base station) as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or task supporting timing for reference signals in multiple numerology wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support timing for reference signals in multiple numerology wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other network device 105 (e.g., another base station), and may include a controller or scheduler for controlling communications with UEs 115 in cooperation with other network devices 105 (e.g., base stations). For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between network devices 105 (e.g., between base stations).

Figure 14:
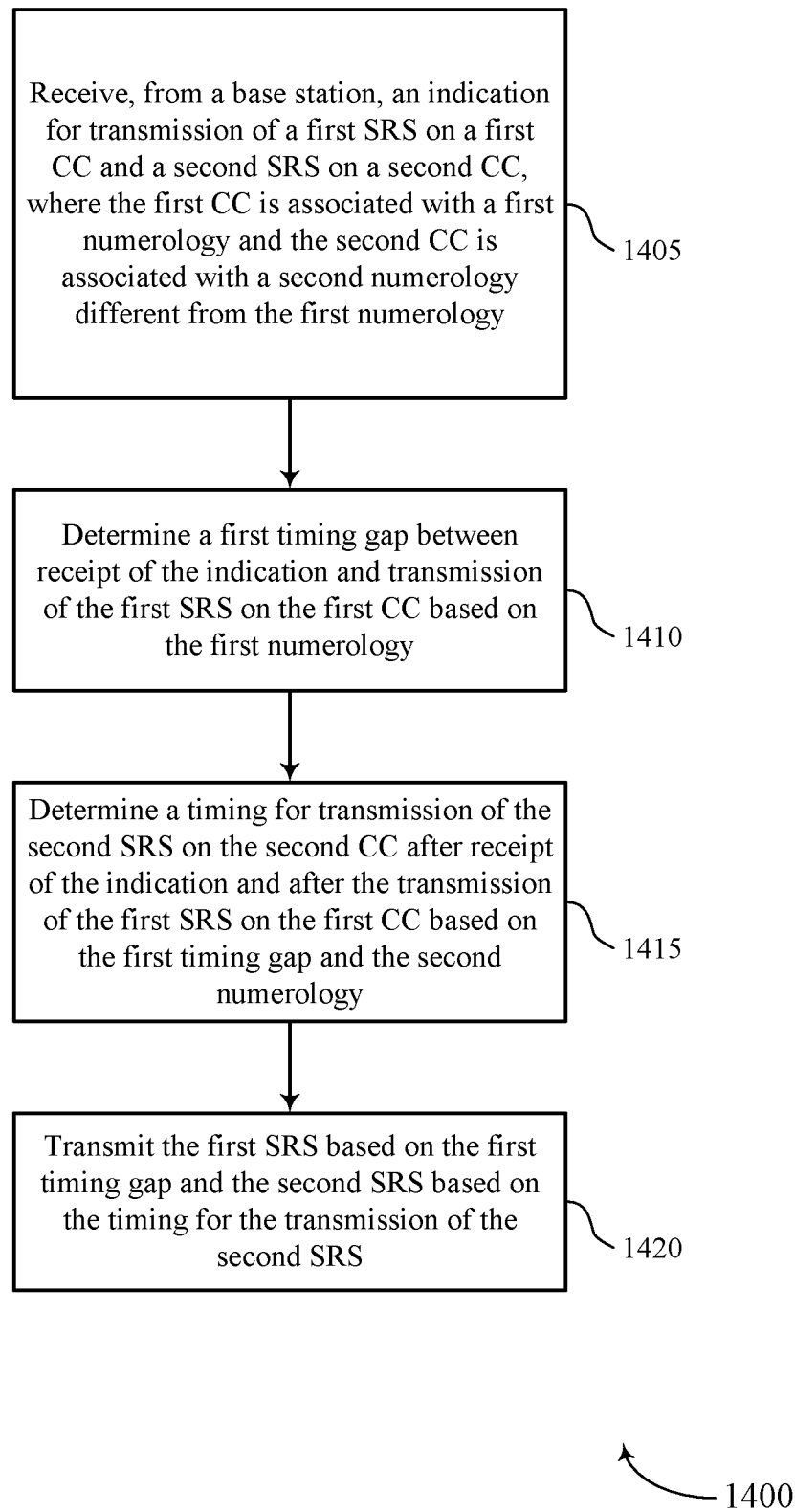
FIGS. 14 through 16 illustrate methods for timing for reference signals in multiple numerology wireless communications in accordance with aspects of the present disclosure.

FIG. 14 shows a flowchart illustrating a method 1400 for timing for reference signals in multiple numerology wireless communications in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a network device 105 (e.g., a base station), an indication for transmission of a first SRS on a first CC and a second SRS on a second CC, where the first CC is associated with a first numerology and the second CC is associated with a second numerology different from the first numerology. The operations of 1405 may be performed according to the methods described herein. In certain examples, aspects of the operations of 1405 may be performed by a reception component as described with reference to FIGS. 6 through 9.

At 1410 the UE 115 may determine a first timing gap between receipt of the indication and transmission of the first SRS on the first CC based on the first numerology. The operations of 1410 may be performed according to the methods described herein. In certain examples, aspects of the operations of 1410 may be performed by a first timing component as described with reference to FIGS. 6 through 9.

At 1415 the UE 115 may determine a timing for transmission of the second SRS on the second CC after receipt of the indication and after the transmission of the first SRS on the first CC based on the first timing gap and the second numerology. The operations of 1415 may be performed according to the methods described herein. In certain examples, aspects of the operations of 1415 may be performed by a second timing component as described with reference to FIGS. 6 through 9.

At 1420 the UE 115 may transmit the first SRS based on the first timing gap and the second SRS based on the timing for the transmission of the second SRS. The operations of 1420 may be performed according to the methods described herein. In certain examples, aspects of the operations of 1420 may be performed by a transmission component as described with reference to FIGS. 6 through 9.

Figure 15:
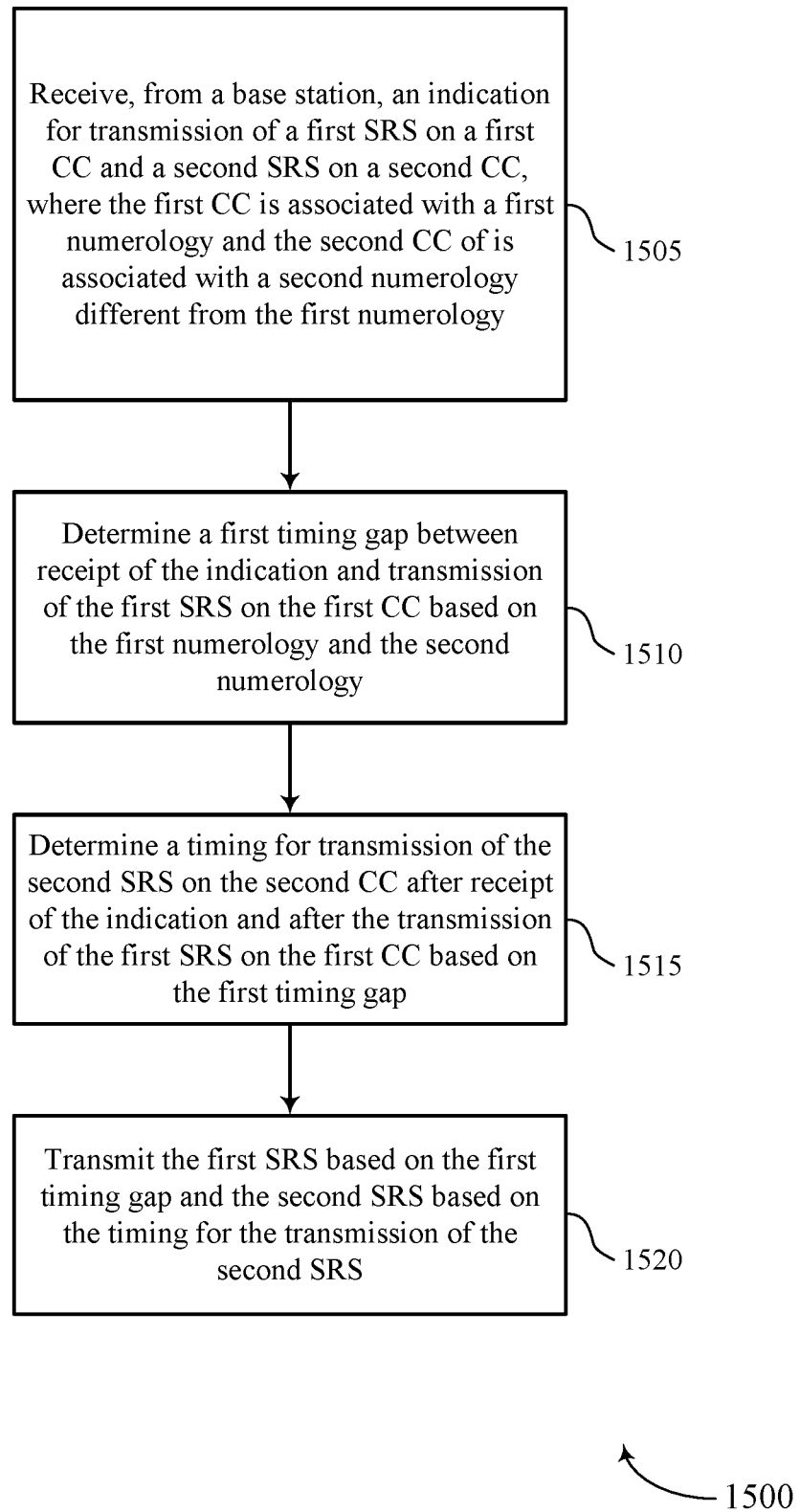

FIG. 15 shows a flowchart illustrating a method 1500 for timing for reference signals in multiple numerology wireless communications in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a network device 105 (e.g., a base station), an indication for transmission of a first SRS on a first CC and a second SRS on a second CC, where the first CC is associated with a first numerology and the second CC is associated with a second numerology different from the first numerology. The operations of 1505 may be performed according to the methods described herein. In certain examples, aspects of the operations of 1505 may be performed by a reception component as described with reference to FIGS. 6 through 9.

At 1510 the UE 115 may determine a first timing gap between receipt of the indication and transmission of the first SRS on the first CC based on the first numerology and the second numerology. The operations of 1510 may be performed according to the methods described herein. In certain examples, aspects of the operations of 1510 may be performed by a first timing component as described with reference to FIGS. 6 through 9.

At 1515 the UE 115 may determine a timing for transmission of the second SRS on the second CC after receipt of the indication and after the transmission of the first SRS on the first CC based on the first timing gap. The operations of 1515 may be performed according to the methods described herein. In certain examples, aspects of the operations of 1515 may be performed by a second timing component as described with reference to FIGS. 6 through 9.

At 1520 the UE 115 may transmit the first SRS based on the first timing gap and the second SRS based on the timing for the transmission of the second SRS. The operations of 1520 may be performed according to the methods described herein. In certain examples, aspects of the operations of 1520 may be performed by a transmission component as described with reference to FIGS. 6 through 9.

Figure 16:
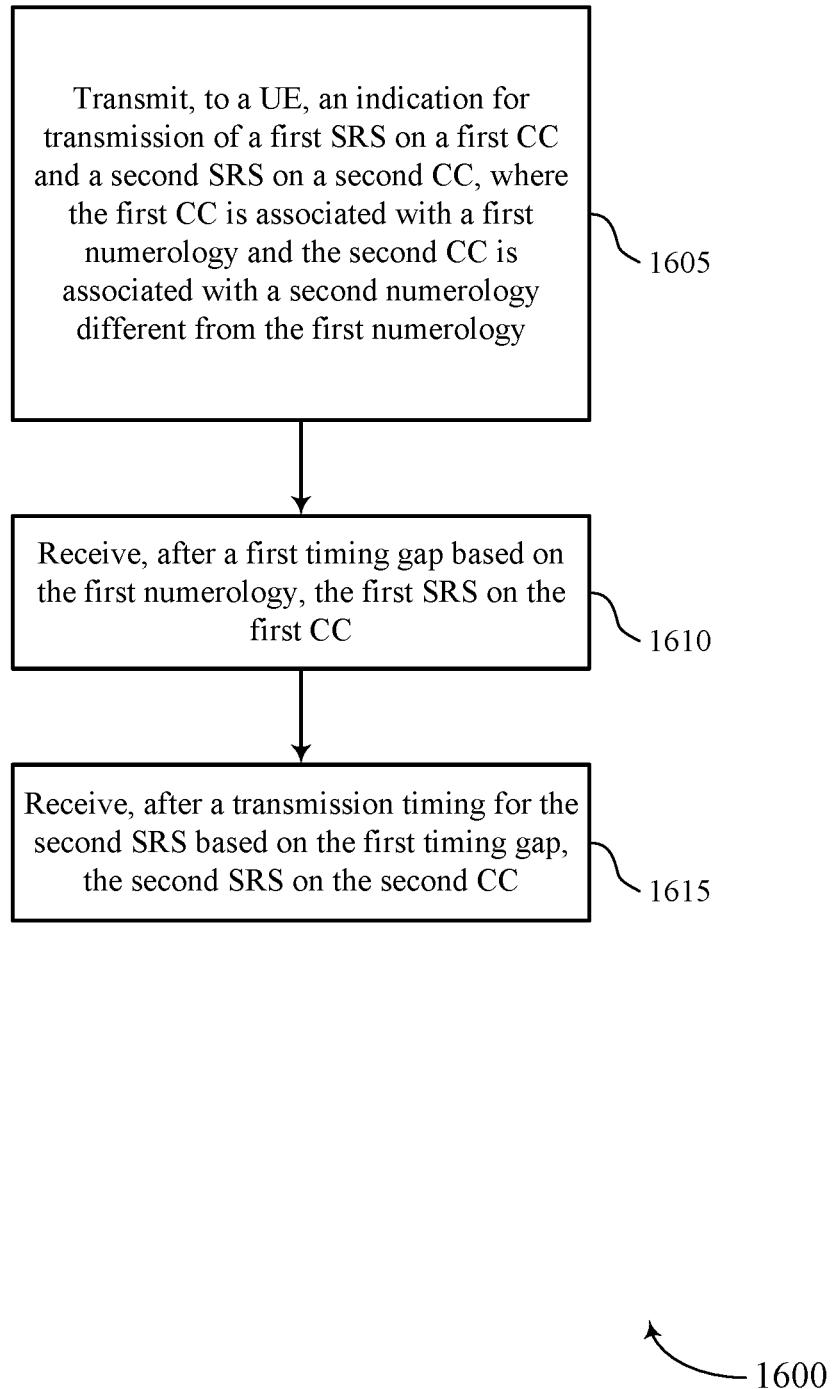

FIG. 16 shows a flowchart illustrating a method 1600 for timing for reference signals in multiple numerology wireless communications in accordance with aspects of the present disclosure. The operations of method 1600 may be implemented by a network device 105 (e.g., a base station) or its components as described herein. For example, the operations of method 1600 may be performed by a base station communications manager as described with reference to FIGS. 10 through 13. In some examples, a network device 105 (e.g., a base station) may execute a set of codes to control the functional elements of the device to perform the functions described below. Additionally or alternatively, the network device 105 may perform aspects of the functions described below using special-purpose hardware.

At 1605 the network device 105 may transmit, to a UE 115, an indication for transmission of a first SRS on a first CC and a second SRS on a second CC, where the first CC is associated with a first numerology and the second CC is associated with a second numerology different from the first numerology. The operations of 1605 may be performed according to the methods described herein. In certain examples, aspects of the operations of 1605 may be performed by an indication transmitter as described with reference to FIGS. 10 through 13.

At 1610 the network device 105 may receive, after a first timing gap based on the first numerology, the first SRS on the first CC. The operations of 1610 may be performed according to the methods described herein. In certain examples, aspects of the operations of 1610 may be performed by a first SRS receiver as described with reference to FIGS. 10 through 13.

At 1615 the network device 105 may receive, after a transmission timing for the second SRS based on the first timing gap, the second SRS on the second CC. The operations of 1615 may be performed according to the methods described herein. In certain examples, aspects of the operations of 1615 may be performed by a second SRS receiver as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered network device 105 (e.g., a base station), as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems 100 or 200, or systems described herein may support synchronous or asynchronous operation. For synchronous operation, the network devices 105 (e.g., base stations) may have similar frame timing, and transmissions from different network devices 105 (e.g., other base stations) may be approximately aligned in time. For asynchronous operation, the network devices 105 may have different frame timing, and transmissions from different network devices 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
receiving, from a base station, an indication for transmission of a first sounding reference signal (SRS) on a first component carrier (CC) and a second SRS on a second CC, wherein the first CC is associated with a first numerology and the second CC is associated with a second numerology different from the first numerology;
determining a first timing gap between receipt of the indication and transmission of the first SRS on the first CC based at least in part on the first numerology;
determining a timing for transmission of the second SRS on the second CC after receipt of the indication and after the transmission of the first SRS on the first CC based at least in part on the first timing gap and the second numerology and based at least in part on a retune time associated with retuning from the first CC to the second CC; and
transmitting the first SRS based at least in part on the first timing gap and the second SRS based at least in part on the timing for the transmission of the second SRS.

2. The method of claim 1, further comprising:
determining a first time duration corresponding to a first number of symbols associated with the first numerology, wherein the first timing gap is determined based at least in part on the first time duration.

3. The method of claim 2, wherein the first number of symbols corresponds to a time between receipt of an uplink grant and transmission of uplink data for the first numerology.

4. The method of claim 2, wherein the first number of symbols corresponds to a time between receipt of a physical downlink control channel (PDCCH) and transmission of the first SRS for the first numerology.

5. The method of claim 2, further comprising:
determining a second time duration corresponding to a second number of symbols associated with the second numerology, wherein the timing for the transmission of the second SRS on the second CC is determined based at least in part on the first time duration and the second time duration.

6. The method of claim 5, further comprising:
determining the second time duration based at least in part on a retune time associated with retuning from the first CC to the second CC and a transmission time associated with transmission of the first SRS on the first CC.

7. The method of claim 5, wherein the second number of symbols corresponds to a time between receipt of an uplink grant and transmission of uplink data for the second numerology, a time between receipt of a channel state information reference signal (CSIRS) and transmission of a channel state feedback (CSF) message for the second numerology, or a time between receipt of a physical downlink control channel (PDCCH) message and transmission of the second SRS for the second numerology.

8. The method of claim 1, wherein receiving the indication comprises:
receiving an indication for transmission of a third SRS on a third CC associated with a third numerology different from the first and second numerologies.

9. The method of claim 8, further comprising:
determining a timing for transmission of the third SRS on the third CC after receipt of the indication for transmission of the third SRS on the third CC and after the transmission of the second SRS on the second CC based at least in part on the timing for the transmission of the second SRS on the second CC and the third numerology; and
transmitting the third SRS based at least in part on the timing for the transmission of the third SRS.

10. The method of claim 1, wherein receiving the indication comprises:
receiving an indication for transmission of additional SRSs on respective CCs.

11. The method of claim 10, further comprising:
determining respective transmission timings for the additional SRSs based at least in part on numerologies associated with the respective CCs; and
transmitting the additional SRSs on the respective CCs based at least in part on the respective transmission timings.

12. The method of claim 1, wherein the indication comprises a grant scheduling the first and second SRS transmissions and is received via a physical downlink control channel (PDCCH).

13. A method for wireless communications, comprising:
receiving, from a base station, an indication for transmission of a first sounding reference signal (SRS) on a first component carrier (CC) and a second SRS on a second CC, wherein the first CC is associated with a first numerology and the second CC is associated with a second numerology different from the first numerology;
determining a first timing gap between receipt of the indication and transmission of the first SRS on the first CC based at least in part on the first numerology and the second numerology;
determining a timing for transmission of the second SRS on the second CC after receipt of the indication and after the transmission of the first SRS on the first CC based at least in part on the first timing gap and based at least in part on a retune time associated with retuning from the first CC to the second CC; and
transmitting the first SRS based at least in part on the first timing gap and the second SRS based at least in part on the timing for the transmission of the second SRS.

14. The method of claim 13, wherein determining the first timing gap comprises:
determining a first time duration associated with the first numerology;
determining a second time duration associated with the second numerology; and
determining a maximum of the first time duration and the second time duration.

15. The method of claim 13, further comprising:
determining a first time duration corresponding to a first number of symbols associated with the first numerology; and
determining a second time duration corresponding to a second number of symbols associated with the second numerology, wherein the first timing gap is determined based at least in part on the first and second time durations.

16. The method of claim 15, wherein the first number of symbols corresponds to a time between receipt of an uplink grant and transmission of uplink data for the first numerology.

17. The method of claim 15, wherein the first number of symbols corresponds to a time between receipt of a physical downlink control channel (PDCCH) message and transmission of the first SRS for the first numerology.

18. The method of claim 15, wherein the second number of symbols corresponds to a time between receipt of an uplink grant and transmission of uplink data for the second numerology, a time between receipt of a channel state information reference signal (CSIRS) and transmission of a channel state feedback (CSF) message for the second numerology, or a time between receipt of a physical downlink control channel (PDCCH) message and transmission of the second SRS for the second numerology.

19. The method of claim 13, further comprising:
determining the timing for the transmission of the second SRS on the second CC based at least in part on a transmission time associated with transmission of the first SRS on the first CC.

20. The method of claim 13, wherein receiving the indication comprises:
receiving an indication for transmission of a third SRS on a third CC associated with a third numerology different from the first and second numerologies.

21. The method of claim 20, further comprising:
determining a first time duration corresponding to a first number of symbols associated with the first numerology;
determining a second time duration corresponding to a second number of symbols associated with the second numerology; and
determining a third time duration corresponding to a third number of symbols associated with the third numerology, wherein the first timing gap is determined based at least in part on the first, second, and third time durations.

22. The method of claim 21, further comprising:
determining a timing for transmission of the third SRS on the third CC after receipt of the indication for transmission of the third SRS on the third CC and after the transmission of the second SRS on the second CC based at least in part on the timing for the transmission of the second SRS on the second CC; and
transmitting the third SRS based at least in part on the timing for the transmission of the third SRS on the third CC.

23. The method of claim 13, wherein receiving the indication comprises:
receiving an indication for transmission of additional SRSs on respective CCs associated with respective numerologies.

24. The method of claim 23, further comprising:
determining additional time durations corresponding to respective numbers of symbols associated with the respective numerologies, wherein the first timing gap is determined based at least in part on the additional time durations.

25. The method of claim 13, wherein the indication comprises a grant scheduling the first and second SRS transmissions and is received via a physical downlink control channel (PDCCH).

26. A method for wireless communications, comprising:
transmitting, to a user equipment (UE), an indication for transmission of a first sounding reference signal (SRS) on a first component carrier (CC) and a second SRS on a second CC, wherein the first CC is associated with a first numerology and the second CC is associated with a second numerology different from the first numerology;
receiving, after a first timing gap based at least in part on the first numerology, the first SRS on the first CC; and
receiving, after a transmission timing for the second SRS based at least in part on the first timing gap, the second SRS on the second CC, wherein the transmission timing for the second SRS is based at least in part on a retune time associated with retuning from the first CC to the second CC.

27. The method of claim 26, wherein:
the first timing gap is based at least in part on a first number of symbols associated with the first numerology; and
the transmission timing for the second SRS is based at least in part on a second number of symbols associated with the second numerology.

28. The method of claim 26, wherein the first timing gap is based at least in part on the second numerology.

29. The method of claim 26, wherein the transmission timing for the second SRS is based at least in part on a transmission time associated with transmission of the first SRS on the first CC.

30. The method of claim 26, wherein transmitting the indication comprises:
transmitting an indication for transmission of a third SRS on a third CC associated with a third numerology different from the first and second numerologies.

31. The method of claim 30, further comprising:
receiving, after a transmission timing for the third SRS based at least in part on the transmission timing for the second SRS, the third SRS on the third CC.

32. The method of claim 26, wherein the indication comprises a grant scheduling the first and second SRS transmissions and is transmitted via a physical downlink control channel (PDCCH).

33. An apparatus for wireless communications, comprising:
a processor;
memory in electronic communication with the processor; and
instructions stored in the memory and executable by the processor to cause the apparatus to:
receive, from a base station, an indication for transmission of a first sounding reference signal (SRS) on a first component carrier (CC) and a second SRS on a second CC, wherein the first CC is associated with a first numerology and the second CC is associated with a second numerology different from the first numerology;
determine a first timing gap between receipt of the indication and transmission of the first SRS on the first CC based at least in part on the first numerology;
determine a timing for transmission of the second SRS on the second CC after receipt of the indication and after the transmission of the first SRS on the first CC based at least in part on the first timing gap and the second numerology and based at least in part on a retune time associated with retuning from the first CC to the second CC; and
transmit the first SRS based at least in part on the first timing gap and second SRS based at least in part on the timing for the transmission of the second SRS.

34. The apparatus of claim 33, wherein the instructions are further executable by the processor to cause the apparatus to:
determine a first time duration corresponding to a first number of symbols associated with the first numerology, wherein the first timing gap is determined based at least in part on the first time duration.

35. The apparatus of claim 34, wherein the first number of symbols corresponds to a time between receipt of an uplink grant and transmission of uplink data for the first numerology.

36. The apparatus of claim 34, wherein the first number of symbols corresponds to a time between receipt of a physical downlink control channel (PDCCH) message and transmission of the first SRS for the first numerology.

37. The apparatus of claim 34, wherein the instructions are further executable by the processor to cause the apparatus to:
determine a second time duration corresponding to a second number of symbols associated with the second numerology, wherein the timing for the transmission of the second SRS on the second CC is determined based at least in part on the first time duration and the second time duration.

38. The apparatus of claim 37, wherein the instructions are further executable by the processor to cause the apparatus to:
determine the second time duration based at least in part on a transmission time associated with transmission of the first SRS on the first CC.

39. The apparatus of claim 37, wherein the second number of symbols corresponds to a time between receipt of an uplink grant and transmission of uplink data for the second numerology, a time between receipt of a channel state information reference signal (CSIRS) and transmission of a channel state feedback (CSF) message for the second numerology, or a time between receipt of a physical downlink control channel (PDCCH) message and transmission of the second SRS for the second numerology.

40. The apparatus of claim 33, wherein the instructions to receive the indication are executable by the processor to cause the apparatus to:
receive an indication for transmission of a third SRS on a third CC associated with a third numerology different from the first and second numerologies.

41. The apparatus of claim 40, wherein the instructions are further executable by the processor to cause the apparatus to:
determine a timing for transmission of the third SRS on the third CC after receipt of the indication for transmission of the third SRS on the third CC and after the transmission of the second SRS based at least in part on the timing for the transmission of the second SRS and the third numerology; and
transmit the third SRS based at least in part on the timing for the transmission of the third SRS.

42. The apparatus of claim 33, wherein the instructions to receive the indication are executable by the processor to cause the apparatus to:
receive an indication for transmission of additional SRSs on respective CCs.

43. The apparatus of claim 42, wherein the instructions are further executable by the processor to cause the apparatus to:
determine respective transmission timings for the additional SRSs based at least in part on numerologies associated with the respective CCs; and
transmit the additional SRSs on the respective CCs based at least in part on the respective transmission timings.

44. The apparatus of claim 33, wherein the indication comprises a grant scheduling the first and second SRS transmissions and is received via a physical downlink control channel (PDCCH).

45. An apparatus for wireless communications, comprising:
a processor;
memory in electronic communication with the processor; and
instructions stored in the memory and executable by the processor to cause the apparatus to:
receive, from a base station, an indication for transmission of a first sounding reference signal (SRS) on a first component carrier (CC) and a second SRS on a second CC, wherein the first CC is associated with a first numerology and the second CC is associated with a second numerology different from the first numerology;
determine a first timing gap between receipt of the indication and transmission of the first SRS on the first CC based at least in part on the first numerology and the second numerology;
determine a timing for transmission of the second SRS on the second CC after receipt of the indication and after the transmission of the first SRS on the first CC based at least in part on the first timing gap and based at least in part on a retune time associated with retuning from the first CC to the second CC; and
transmit the first SRS based at least in part on the first timing gap and the second SRS based at least in part on the timing for the transmission of the second SRS.

46. The apparatus of claim 45, wherein the instructions are further executable by the processor to cause the apparatus to:
determine a first time duration associated with the first numerology; and
determine a second time duration associated with the second numerology; and
determine a maximum of the first time duration and the second time duration.

47. The apparatus of claim 45, wherein the instructions are further executable by the processor to cause the apparatus to:
determine a first time duration corresponding to a first number of symbols associated with the first numerology; and
determine a second time duration corresponding to a second number of symbols associated with the second numerology, wherein the first timing gap is determined based at least in part on the first and second time durations.

48. The apparatus of claim 47, wherein the first number of symbols corresponds to a time between receipt of an uplink grant and transmission of uplink data for the first numerology.

49. The apparatus of claim 47, wherein the first number of symbols corresponds to a time between receipt of a physical downlink control channel (PDCCH) message and transmission of the first SRS for the first numerology.

50. The apparatus of claim 47, wherein the second number of symbols corresponds to a time between receipt of an uplink grant and transmission of uplink data for the second numerology, a time between receipt of a channel state information reference signal (CSIRS) and transmission of a channel state feedback (CSF) message for the second numerology, or a time between receipt of a physical downlink control channel (PDCCH) message and transmission of the second SRS for the second numerology.

51. The apparatus of claim 45, wherein the instructions are further executable by the processor to cause the apparatus to:

determine the timing for the transmission of the second SRS on the second CC based at least in part on a transmission time associated with transmission of the first SRS on the first CC.

52. The apparatus of claim 45, wherein the instructions to receive the indication are executable by the processor to cause the apparatus to:
receive an indication for transmission of a third SRS on a third CC associated with a third numerology different from the first and second numerologies.

53. The apparatus of claim 52, wherein the instructions are further executable by the processor to cause the apparatus to:
determine a first time duration corresponding to a first number of symbols associated with the first numerology;
determine a second time duration corresponding to a second number of symbols associated with the second numerology; and
determine a third time duration corresponding to a third number of symbols associated with the third numerology, wherein the first timing gap is determined based at least in part on the first, second, and third time durations.

54. The apparatus of claim 53, wherein the instructions are further executable by the processor to cause the apparatus to:
determine a timing for transmission of the third SRS on the third CC after receipt of the indication for transmission of the third SRS on the third CC and after the transmission of the second SRS on the second CC based at least in part on the timing for the transmission of the second SRS on the second CC; and
transmit the third SRS based at least in part on the timing for the transmission of the third SRS.

55. The apparatus of claim 45, wherein the instructions to receive the indication are executable by the processor to cause the apparatus to:
receive an indication for transmission of additional SRSs on respective CCs associated with respective numerologies.

56. The apparatus of claim 55, wherein the instructions are further executable by the processor to cause the apparatus to:
determine additional time durations corresponding to respective numbers of symbols associated with the respective numerologies, wherein the first timing gap is determined based at least in part on the additional time durations.

57. The apparatus of claim 45, wherein the indication comprises a grant scheduling the first and second SRS transmissions and is received via a physical downlink control channel (PDCCH).

58. An apparatus for wireless communications, comprising:
a processor;
memory in electronic communication with the processor; and
instructions stored in the memory and executable by the processor to cause the apparatus to:
transmit, to a user equipment (UE), an indication for transmission of a first sounding reference signal (SRS) on a first component carrier (CC) and a second SRS on a second CC, wherein the first CC is associated with a first numerology and the second CC is associated with a second numerology different from the first numerology;
receive, after a first timing gap based at least in part on the first numerology, the first SRS on the first CC; and
receive, after a transmission timing for the second SRS based at least in part on the first timing gap, the second SRS on the second CC, wherein the transmission timing for the second SRS is based at least in part on a retune time associated with retuning from the first CC to the second CC.

59. The apparatus of claim 58, wherein:
the first timing gap is based at least in part on a first number of symbols associated with the first numerology; and
the transmission timing for the second SRS is based at least in part on a second number of symbols associated with the second numerology.

60. The apparatus of claim 58, wherein the first timing gap is based at least in part on the second numerology.

61. The apparatus of claim 58, wherein the transmission timing for the second SRS is based at least in part on a transmission time associated with transmission of the first SRS on the first CC.

62. The apparatus of claim 58, wherein the instructions to transmit the indication are executable by the processor to cause the apparatus to:
transmit an indication for transmission of a third SRS on a third CC associated with a third numerology different from the first and second numerologies.

63. The apparatus of claim 62, wherein the instructions are further executable by the processor to cause the apparatus to:
receive, after a transmission timing for the third SRS based at least in part on the transmission timing for the second SRS, the third SRS on the third CC.

64. The apparatus of claim 58, wherein the indication comprises a grant scheduling the first and second SRS transmissions and is transmitted via a physical downlink control channel (PDCCH).

65. An apparatus for wireless communications, comprising:
means for receiving, from a base station, an indication for transmission of a first sounding reference signal (SRS) on a first component carrier (CC) and a second SRS on a second CC, wherein the first CC is associated with a first numerology and the second CC is associated with a second numerology different from the first numerology;
means for determining a first timing gap between receipt of the indication and transmission of the first SRS on the first CC based at least in part on the first numerology;
means for determining a timing for transmission of the second SRS on the second CC after receipt of the indication and after the transmission of the first SRS on the first CC based at least in part on the first timing gap and the second numerology and based at least in part on a retune time associated with retuning from the first CC to the second CC; and
means for transmitting the first SRS based at least in part on the first timing gap and the second SRS based at least in part on the timing for the transmission of the second SRS.

66. An apparatus for wireless communications, comprising:
means for receiving, from a base station, an indication for transmission of a first sounding reference signal (SRS) on a first component carrier (CC) and a second SRS on a second CC, wherein the first CC is associated with a first numerology and the second CC is associated with a second numerology different from the first numerology;

means for determining a first timing gap between receipt of the indication and transmission of the first SRS on the first CC based at least in part on the first numerology and the second numerology;

means for determining a timing for transmission of the second SRS on the second CC after receipt of the indication and after the transmission of the first SRS on the first CC based at least in part on the first timing gap and based at least in part on a retune time associated with retuning from the first CC to the second CC; and means for transmitting the first SRS based at least in part on the first timing gap and the second SRS based at least in part on the timing for the transmission of the second SRS.

67. An apparatus for wireless communications, comprising:

means for transmitting, to a user equipment (UE), an indication for transmission of a first sounding reference signal (SRS) on a first component carrier (CC) and a second SRS on a second CC, wherein the first CC is associated with a first numerology and the second CC is associated with a second numerology different from the first numerology;

means for receiving, after a first timing gap based at least in part on the first numerology, the first SRS on the first CC; and means for receiving, after a transmission timing for the second SRS based at least in part on the first timing gap, the second SRS on the second CC, wherein the transmission timing for the second SRS is based at least in part on a retune time associated with retuning from the first CC to the second CC.

68. A non-transitory computer-readable medium storing code for wireless communications, the code comprising instructions executable by a processor to:

receive, from a base station, an indication for transmission of a first sounding reference signal (SRS) on a first component carrier (CC) and a second SRS on a second CC, wherein the first CC is associated with a first numerology and the second CC is associated with a second numerology different from the first numerology;

determine a first timing gap between receipt of the indication and transmission of the first SRS on the first CC based at least in part on the first numerology;

determine a timing for transmission of the second SRS on the second CC after receipt of the indication and after the between transmission of the first SRS on the first CC based at least in part on the first timing gap and the second numerology and based at least in part on a retune time associated with retuning from the first CC to the second CC; and transmit the first SRS based at least in part on the first timing gap and the second SRS based at least in part on the timing for the transmission of the second SRS.

69. A non-transitory computer-readable medium storing code for wireless communications, the code comprising instructions executable by a processor to:

receive, from a base station, an indication for transmission of a first sounding reference signal (SRS) on a first component carrier (CC) and a second SRS on a second CC, wherein the first CC is associated with a first numerology and the second CC is associated with a second numerology different from the first numerology;

determine a first timing gap between receipt of the indication and transmission of the first SRS on the first CC based at least in part on the first numerology and the second numerology;

determine a timing for transmission of the second SRS on the second CC after receipt of the indication and after the transmission of the first SRS on the first CC based at least in part on the first timing gap and based at least in part on a retune time associated with retuning from the first CC to the second CC; and transmit the first SRS based at least in part on the first timing gap and the second SRS based at least in part on the timing for the transmission of the second SRS.

70. A non-transitory computer-readable medium storing code for wireless communications, the code comprising instructions executable by a processor to:

transmit, to a user equipment (UE), an indication for transmission of a first sounding reference signal (SRS) on a first component carrier (CC) and a second SRS on a second CC, wherein the first CC is associated with a first numerology and the second CC is associated with a second numerology different from the first numerology;

receive, after a first timing gap based at least in part on the first numerology, the first SRS on the first CC; and receive, after a transmission timing for the second SRS based at least in part on the first timing gap, the second SRS on the second CC, wherein the transmission timing for the second SRS is based at least in part on a retune time associated with retuning from the first CC to the second CC.

* * * * *